US010732690B2

(12) United States Patent
Hauser et al.

(10) Patent No.: US 10,732,690 B2
(45) Date of Patent: Aug. 4, 2020

(54) SYSTEMS AND METHODS FOR MONITORING STATE TRANSITIONS

(71) Applicant: Arm IP Limited, Cambridge (GB)

(72) Inventors: Niklas Lennart Hauser, Cambridge (GB); Brendan James Moran, Histon (GB); Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 60 days.

(21) Appl. No.: 15/982,560

(22) Filed: May 17, 2018

(65) Prior Publication Data

US 2019/0354153 A1 Nov. 21, 2019

(51) Int. Cl.

| | |
|---|---|
| ***G06F 1/3206*** | (2019.01) |
| ***G06F 1/28*** | (2006.01) |
| ***G06F 8/65*** | (2018.01) |
| ***G01R 31/392*** | (2019.01) |

(52) U.S. Cl.

CPC ............. *G06F 1/28* (2013.01); *G01R 31/392* (2019.01); *G06F 1/3206* (2013.01); *G06F 8/65* (2013.01)

(58) Field of Classification Search

CPC combination set(s) only.
See application file for complete search history.

(56) References Cited

U.S. PATENT DOCUMENTS 8,355,805 B2 * 1/2013 Ricket ........................ G06F 1/26 700/19
8,442,786 B2 * 5/2013 Naffziger ................ G06F 1/206 702/62
9,268,938 B1 2/2016 Gonzalez et al.
9,537,313 B2 1/2017 Thornton et al.
9,820,225 B2 11/2017 Ang et al.
9,996,142 B2 6/2018 Bulusu et al.
2011/0072293 A1 * 3/2011 Mazzaferri ........... G06F 1/3203 713/340
2014/0006823 A1 * 1/2014 Lamb .................. H02J 13/0086 713/323
2014/0068299 A1 * 3/2014 Koinuma .................. G06F 1/28 713/322
2015/0074441 A1 * 3/2015 Sako ......................... H02J 3/14 713/330
2016/0034013 A1 * 2/2016 Kim ........................ G06F 1/324 713/320

* cited by examiner

*Primary Examiner* — Raymond N Phan
(74) *Attorney, Agent, or Firm* — Leveque IP Law, P.C.

(57) ABSTRACT

Broadly speaking, the present techniques provide methods, apparatus and systems for monitoring operation of a device. More particularly, the present techniques provide methods for monitoring operation of a device by observing state transitions which occur during the running of a device process following a firmware update, and either comparing the observed state transitions to a state transition map generated within the device or comparing the observed state transitions to a state transition model in, or associated with, the firmware update.

20 Claims, 13 Drawing Sheets

Analysing a firmware update

SYSTEMS AND METHODS FOR MONITORING STATE TRANSITIONS

CROSS-REFERENCE TO RELATED APPLICATIONS

This application is related to the following co-pending U.S. patent applications: application Ser. No. 15/982,582 entitled "SYSTEMS AND METHODS FOR MONITORING POWER CONSUMPTION," filed on even date herewith, which is incorporated herein in its entirety.

FIELD OF THE INVENTION

The present techniques generally relate to methods, apparatus and systems for monitoring operation of a device, and in particular to monitoring the state transitions which occur when device processes are running.

BACKGROUND

There are ever increasing numbers of devices within the home, office buildings or the outdoor environment that have processing and communication capabilities which allow such devices to interact with other processing devices and cloud services. Everyday objects and relatively small-scale processing devices may be connected to each other and to central platforms as part of the "Internet of Things" (IoT). For example, a heating system in the home may gather information from various temperature sensors and control the activation of heaters based on the gathered information; a factory pollution monitoring sensor may gather information from various chemical sensors and arrange maintenance based on the gathered information; whilst a healthcare provider may use wireless sensors, such as a heart rate monitor to track the health of patients while they are at home. In the cases described above, the data is generally forwarded to a cloud service on the internet.

Such IoT devices tend to be wireless and battery-operated, as wired devices are expensive to install and may not be scalable. The lifetime of battery-powered devices may be sufficiently long for their required purpose, and some may be wirelessly chargeable. However, a malicious attack on an IoT device could significantly or entirely drain the device battery, such that, for example, a device lifetime of ten years is reduced to half a day. This vulnerability may make battery-powered IoT devices expensive and undesirable.

The present disclosure broadly provides technologies to improve the security and operational lifetime of devices.

BRIEF DESCRIPTION OF THE DRAWINGS

The techniques are diagrammatically illustrated, by way of example, in the accompanying drawings, in which.

DETAILED DESCRIPTION

Figure 1:
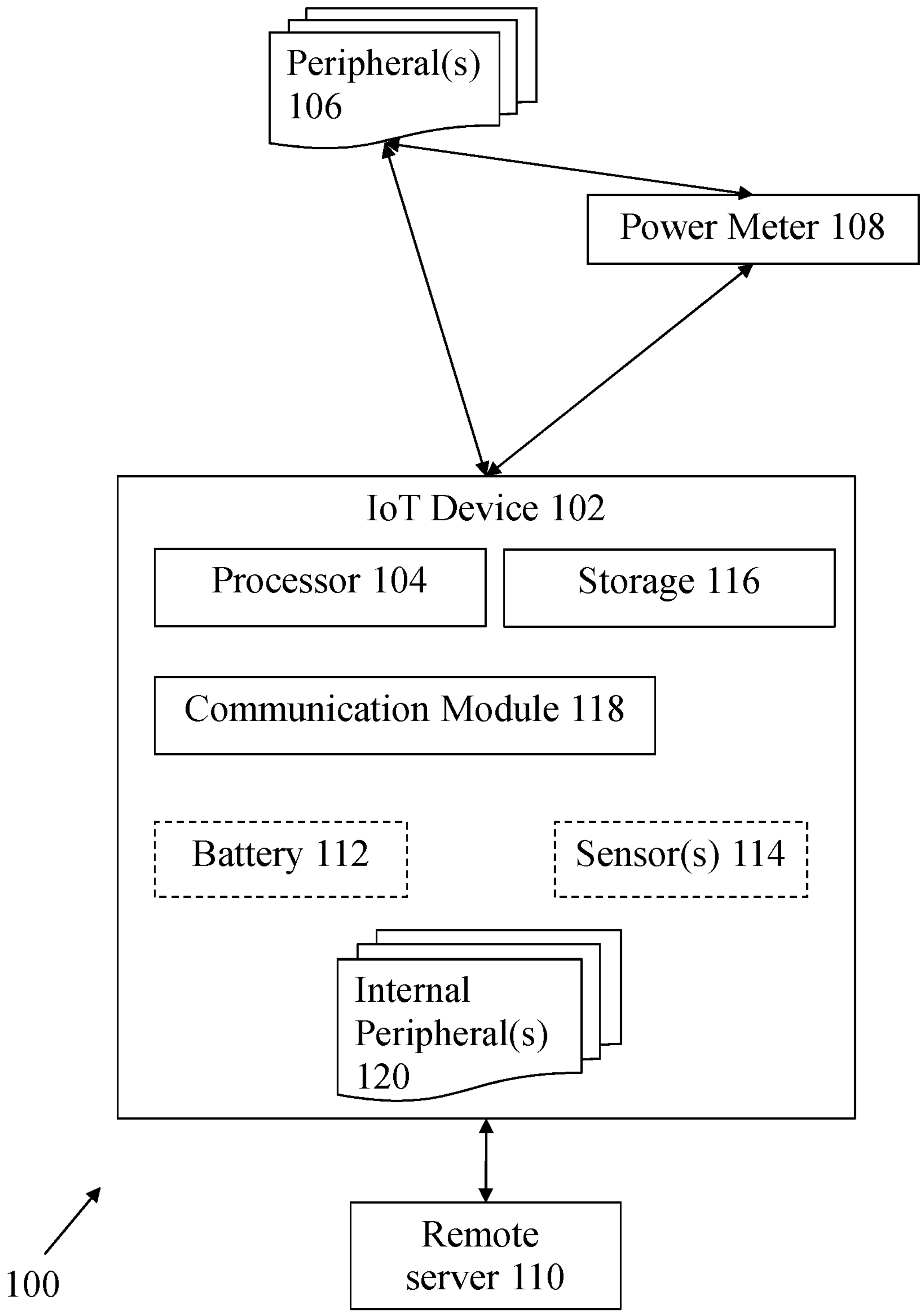
FIG. 1 shows a schematic diagram of a system for monitoring operation of a device.

According to a first aspect of the present techniques, there is provided a machine-implemented method of monitoring operation of a device, the method comprising: receiving a notification that a device process is to begin running; observing state transitions which occur during running of the device process; generating, using the observed state transitions, a state transition map associated with the device process, the state transition map defining expected state transitions and optionally the likelihood of the transition during running of the device process; and storing the generated state transition map for the device process.

The likelihood of each transition can be further annotated by the likelihood of transition depending on one or more previous states, such as may be described in a Markov chain model describing a sequence of events in which the probability of each event depends only on the state attained in the previous event.

According to a second aspect of the present techniques, there is provided an apparatus (such as a remote or backend server) in communicative relationship with a plurality of devices, the apparatus comprising: at least one communication module to: transmit a firmware update to a subset of devices of the plurality of devices, and receive, from the subset of devices, a generated state transition map associated with at least one device process, and at least one processor to: generate a state transition model for each device process using the received state transition maps, and instruct the at least one communication module to transmit the generated state transition model to all of the plurality of devices with the firmware update.

In embodiments, the generated state transition map is further annotated by the likelihood of transition depending on one or more previous states, such as may be described in a Markov chain model describing a sequence of events in which the probability of each event depends on one or more predecessors.

According to a related aspect of the present techniques, there is provided an apparatus comprising: at least one processor to monitor state transitions which occur during running of each apparatus process; and at least one communication module to communicate with a user, remote server or backend system.

According to a related aspect of the present techniques, there is provided a system comprising: at least one server; and a plurality of devices, each device comprising: at least one processor to monitor state transitions which occur during running of each device process, and at least one communication module to communicate with the at least one server; wherein the at least one server comprises: at least one communication module to transmit a firmware update to a subset of devices of the plurality of devices, and receive, from the subset of devices, a generated state transition map associated with at least one device process; and at least one processor to: generate an aggregated state transition model for each device process using the received state transition maps, and instruct the at least one communication module of the server to transmit the generated state transition model to all of the plurality of devices with the firmware update.

By collecting and aggregating state transition maps from multiple devices, a much wider range of possible device behaviour under different situations can be covered. This effort reduces the number of false positives when matching device behaviour against the known transitions in the aggregated transition map.

According to a related aspect of the present techniques, there is provided a non-transitory data carrier carrying code which, when implemented on a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Broadly speaking, the present techniques provide methods, apparatus and systems for monitoring operation of a device. More particularly, the present techniques provide methods for monitoring operation of a device by observing state transitions which occur during the running of a device process following a firmware update, and either comparing the observed state transitions to a state transition map generated within the device or comparing the observed state transitions to a state transition model in, or associated with, the firmware update.

In embodiments, a device receives a firmware update associated with at least one power profile and may install the firmware update. The or each associated power profile may comprise at least one power consumption band that defines a range of possible power consumption values over time for a particular device process. The device may monitor the power consumed by a device process and compare it with the information in the power profile for that device process to determine whether the device process is operating as expected, or if the device process is consuming more or less power than defined in the power profile. If the device process is consuming more power than expected, the device may take action to reduce the power consumption, to improve the security and operational lifetime of the device. In other embodiments, a device may analyse the firmware update, and in particular, the associated power profile(s), to determine whether installing the firmware update may reduce the operational lifetime of the device. If the power profile(s) associated with the firmware update indicate that more power is going to be consumed by a particular device process, such that the lifetime of the device may be reduced, the device may require additional permission or authorisation to install the firmware update.

In embodiments, a device receives a firmware update and may install the firmware update. The device may have, itself, previously generated state transition maps associated with at least one device process. Following the installation of the firmware update, the device may receive a notification (or otherwise) that a device process is running/about to start running. The device may monitor the state transitions which occur while the device process is running, and may compare the monitored state transitions with the generated state transition map associated with that device process. The device may use this comparison to determine if the device process is behaving as expected (i.e. as per the generated state transition map) following the firmware update. If the device process exhibits different state transitions to those the device expects to occur, the device may flag this as indicative of potentially faulty or malicious firmware.

In embodiments, a device receives a firmware update associated with at least one power profile for a device process, each power profile comprising a state transition model for the device process. Following the installation of the firmware update, the device may receive a notification (or otherwise) that a device process is running/about to start running. The device may monitor the state transitions which occur while the device process is running, and may compare the monitored state transitions with the state transition model associated with the device process. The device may use this comparison to determine if the device process is behaving as per the relevant state transition model provided in the firmware update. If the device process causes at least one different state transition to occur, the device may flag this as indicative of potentially faulty or malicious firmware, or of an incorrect state transition model.

Accordingly, the present techniques generally provide methods for using state transition maps or models associated with device processes to monitor and control the operation of a device. The techniques described herein may help to enable the identification of malicious firmware (malware) or a malicious attack on the device (which causes rogue state transitions), or of firmware which (perhaps inadvertently) would cause device power consumption to increase significantly and device lifetime to decrease significantly.

The term "device process" is used herein to generally mean any process which takes place within the device that is being monitored, or in an external peripheral that is connectable to the device that is being monitored. The device process, wherever it occurs, consumes power from the power source of the device that is being monitored. The device process, wherever it occurs, may be a hardware process or a software process.

The term "state transition" is used generally herein to mean what state a device process may move to, based on the device process' current state and other inputs.

State transitions are expected to be annotated by the system software or by the application software and can be identified either by a number, a string or any other unique identifier. For example, before opening a network connection to the server, the application software would announce "State 121" by calling a centralized system function called "AnnounceState" using the integer parameter 121. In some programming languages these state identifiers could be expressed by using a data type enum and leave it to the programming languages compiler to match these internally to integers.

After closing the network connection, the Application would announce State 122 by calling AnnounceState with the parameter 123, on a connection error it would Announce State 124 and so on.

Depending on the application complexity very coarse state announcements can used, for example, "AnnounceState(601) for starting firmware update" and AnnounceState (602) for finishing it again.

The term "state transition map" is used generally herein to mean a map or diagram indicating the states a device process has, and how the device process may move between states. State transition maps can also be the machine-readable representation of the diagram. Through long-time observation of many transitions at the same spot, a likelihood of transitioning from state A to state B can be determined.

These transition announcements can be easily hidden within high level API calls, so the application level programmer won't notice these.

By using consistent IDs across different Firmware versions, execution flow of programs/firmware images can be compared across firmware update, and matched to likely or common other system calls between two announcements.

For example, while reading an image from disk, access to file APIs is expected. If the system suddenly sees network API access between two states A and B enclosing the file operation, a divergence from expected behaviour can be detected.

The present techniques are now described in more detail with reference to the drawings.

FIG. 1 shows a schematic diagram of a system 100 for monitoring operation of a device 102. The system 100 may comprise multiple devices 102—a single device 102 is shown in FIG. 1 for the sake of simplicity.

The devices 102 in system 100 may be any type of electronic device. In embodiments, the device 102 is an Internet of Things (IoT) device. The device 102 may be a constrained resource device. For example, device 102 may be a constrained power device, because the device 102 may not be mains-powered. The term "device" is used interchangeably herein with the terms "apparatus", "IoT device", "electronic device", and "sensor".

The device 102 may comprise a processor 104, which may be coupled to communication module 118 and/or storage 116 (as well as other components of the device). The processor 104 may comprise processing logic to process data (e.g. data regarding the power consumed by the device or a device process), and may generate output data or instructions in response to the data processing. The processor 104 may comprise one or more of: a microprocessor, a microcontroller, and an integrated circuit. In embodiments, the communication module 118 may comprise a dedicated processor.

The device 102 may comprise a communication module 118 to transmit data packets/messages to, and receive data packets/messages from, other elements within system 100, such as remote server 110 (also referred to herein as an "external server", "backend server", "server" or "backend system"), a user of device 102, or other devices 102. The communication module 118 may be any communication module suitable for sending and receiving data packets/messages, or may be a communication module configured to (or adapted to) send and receive data. The communication module 118 may use any suitable communication protocol/technique to communicate with other elements within system 100, such as, but not limited to, wireless communication (e.g. WiFi), short range communication such as radio frequency communication (RFID) or near-field communication (NFC), or by using the communication protocols specified by ZigBee, Thread, Bluetooth, Bluetooth LE, IPv6 over Low Power Wireless Standard (6LoWPAN), or Constrained Application Protocol (CoAP). The communication module 118 may use a wireless mobile (cellular) telecommunication protocol to communicate with remote machines, e.g. 3G, 4G, 5G, etc. In embodiments, the communication module 118 may communicate with other elements using wired communication techniques, such as via metal cables or fibre optic cables. The communication module 118 may use more than one communication technique to communicate with other elements in system 100.

The device 102 may comprise storage 116. The storage 116 may comprise a volatile memory, such as random access memory (RAM), for use as temporary memory, and/or non-volatile memory such as Flash, read only memory (ROM), or electrically erasable programmable ROM (EEPROM), for storing data, programs, or instructions, for example.

The device 102 may, in embodiments, not be mains-powered, or may not be mains-powered at all times. Thus, the device 102 may comprise at least one battery 112 as the device power supply.

The device 102 may comprise at least one sensor 114. For example, the sensor 114 may be a temperature sensor, which may be able to sense/measure the temperature of processor 104. The temperature of the processor 104 may be an indirect indicator of an aggregated power consumption of all device processes that are consuming power at a particular time. The sensor 114 may be a current sensor (or hole sensor), or a voltage sensor/voltmeter, which may enable the aggregated power consumption to be determined. The sensor 114 may be a sensor able to measure the pulse width of a DC to DC convertor. The sensor 114 may be able to measure one or more power supply parameters, which may be indirect indicators of power consumption.

The device 102 may comprise one or more internal peripherals 120, i.e. elements that are coupled to the processor or CPU 104. The internal peripheral 120 may be a cryptographic accelerator, a direct memory access (DMA), an inter-integrated circuit ($I^2C$), an EEPROM chip, an accelerometer, a serial peripheral interface (SPI), an image capture device, a microphone, a touch screen, etc., though it will be understood this is a non-limiting list of possible examples. The internal peripheral(s) 120 may consume power from the power source of the device 102.

The system 100 may comprise one or more external peripherals 106 that are couplable to/coupled to the device 102. The peripheral 106 may be any auxiliary device that may be couplable to the device 102. When coupled to the device 102, the external peripheral 106 may consume power from the power source of the device 102.

The system 100 may comprise a power meter 108, which may be couplable to/coupled to the device 102 to monitor the aggregated power consumption of all device processes. The power meter 108 may measure the total power consumption of the device 102 at a given time, which may include the power consumed by the CPU 104, the communication module 118, internal peripherals 120, internal sensors 114, etc. If the device 102 comprises one or more hardware-supported power tracking points on a circuit board of the device 102, these may be useable to measure both the internal and external power consumption of the device 102, i.e. the power consumed by components within device 102 and the power consumed by peripherals 106 coupled to device 102. In embodiments, the tracking points may enable the power consumption of the CPU 104 to be measured (i.e. “internal” power) and the power consumption of other elements on the circuit board of the device to be measured (i.e. “external” power). Information may be stored in the device 102 that comprises modelled internal power consumption for the device 102. This modelled data may help to attribute internal power consumption to particular elements/components within device 102. This may help to determine how much power is being used by particular elements on the circuit board, and therefore, determine if any elements are consuming more power than they are expected to consume. In embodiments where only a single power tracking point exists on a circuit board of the device 102, the tracking point may still be useable to measure power consumption of the device 102. The modelled data may be used to estimate the internal power consumption of the device, substract it from total power consumption (that may be measured using power meter 108), and to estimate the external power consumption to particular elements/components or peripherals.

The processor 104 or power meter 108 or other element within device 102 may be able to monitor state transitions which occur when a device process is running in device 102.

Figure 5A:
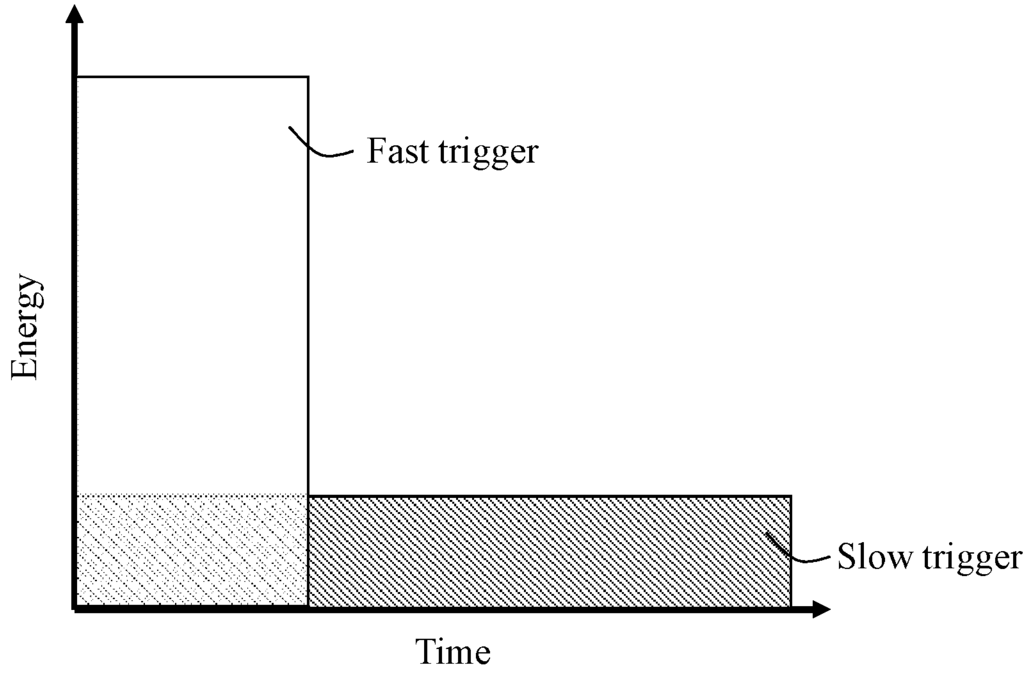
FIG. 5A is an example graph of energy consumption of a device process over time.

Turning to FIG. 5A, this shows an example graph of energy consumption of a device process over time. Some device processes may use lots of energy in a short time period, which may result in a fast trigger within the device 102 that the device process is using more power than expected. Some device processes may use the same amount of energy over a longer time period, and so while they may also consume more power than expected, they may result in a slow trigger within the device 102. Thus, it may be important to monitor the power consumption of a device process over a period of time rather than just monitoring instantaneous power consumption.

Figure 5B:
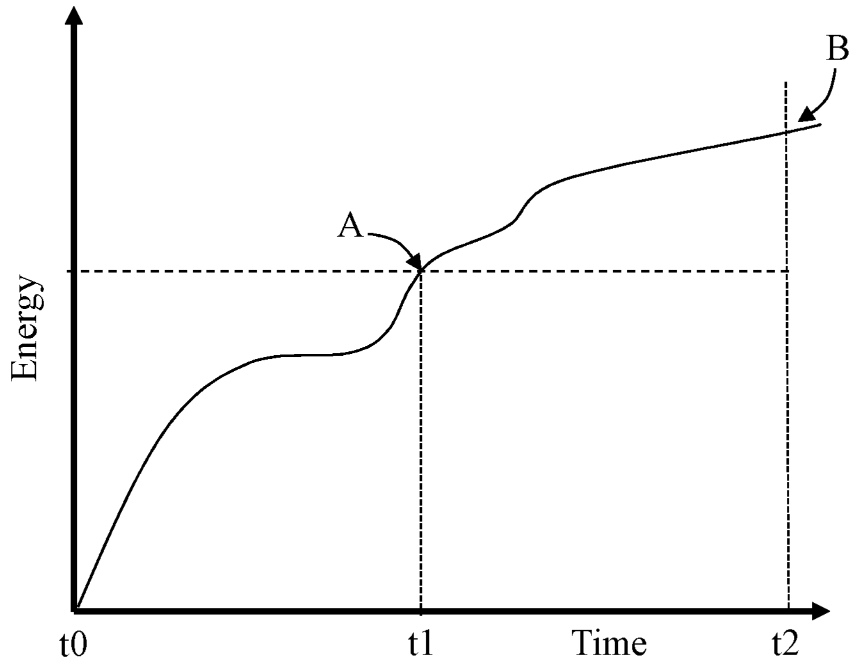
FIG. 5B is an example graph of energy consumption of a device process over time and how monitoring this energy consumption may be used to monitor operation of a device.

FIG. 5B is an example graph of energy consumption of a device process over time and how monitoring this energy consumption may be used to monitor operation of a device. At time t0, the device process may begin consuming power, and monitoring of the power consumption may begin. At time t1, it is determined that the device process is either at, or has just exceeded, the expected power or energy consumption for the device process, as indicated by the horizontal dashed line. At this stage, the device process may be allowed to continue operating. At time t2, the power of the device process may be monitored/measured again. If the power consumed at time t2 indicates that the energy consumed by the device process is increasing (i.e. that B>A), then the device 102 may decide to terminate the device process.

Device processes/tasks are generally interleaved, meaning that multiple device processes may take place at any given time. This means that the power consumed by a device 102 at a given time may be attributed to multiple device processes, but it may be difficult from this to determine which device process is consuming more power than expected. It may be necessary to perform statistical analysis or otherwise to determine which device process is consuming more power than expected. This analysis may utilise a scheduler within device 102 which monitors when each device process takes place, as well as the power profile information stored in device 102 for each device process. It may also be necessary to account for any peripheral devices (internal and/or external), which may cause power to be consumed by device 102.

Thus, in embodiments, monitoring power consumption may comprise: monitoring, using at least one monitoring apparatus, power directly consumed by the device process.

In embodiments, monitoring power consumption may comprise: monitoring, using at least one monitoring apparatus, aggregated power consumed by the device while the device process is running; and disaggregating the aggregated power to determine the power consumed by the device process.

Turning back to FIG. 1, the system 100 may comprise at least one remote server 110. The remote server 110 may be able to communicate with the or each device 102 in system 100. The remote server 110 may send firmware updates to each device 102 in system 100, where each firmware update may be associated with at least one power profile for a device process. The remote server 110 may send the firmware updates as a firmware manifest containing a pointer to a location from which the firmware itself may be obtained, for example a Uniform Resource Locator (URL). The firmware update (or firmware manifest) may comprise the at least one power profile, or may contain a pointer (e.g. a URL) to a location from which the power profile(s) may be obtained.

Figure 2:
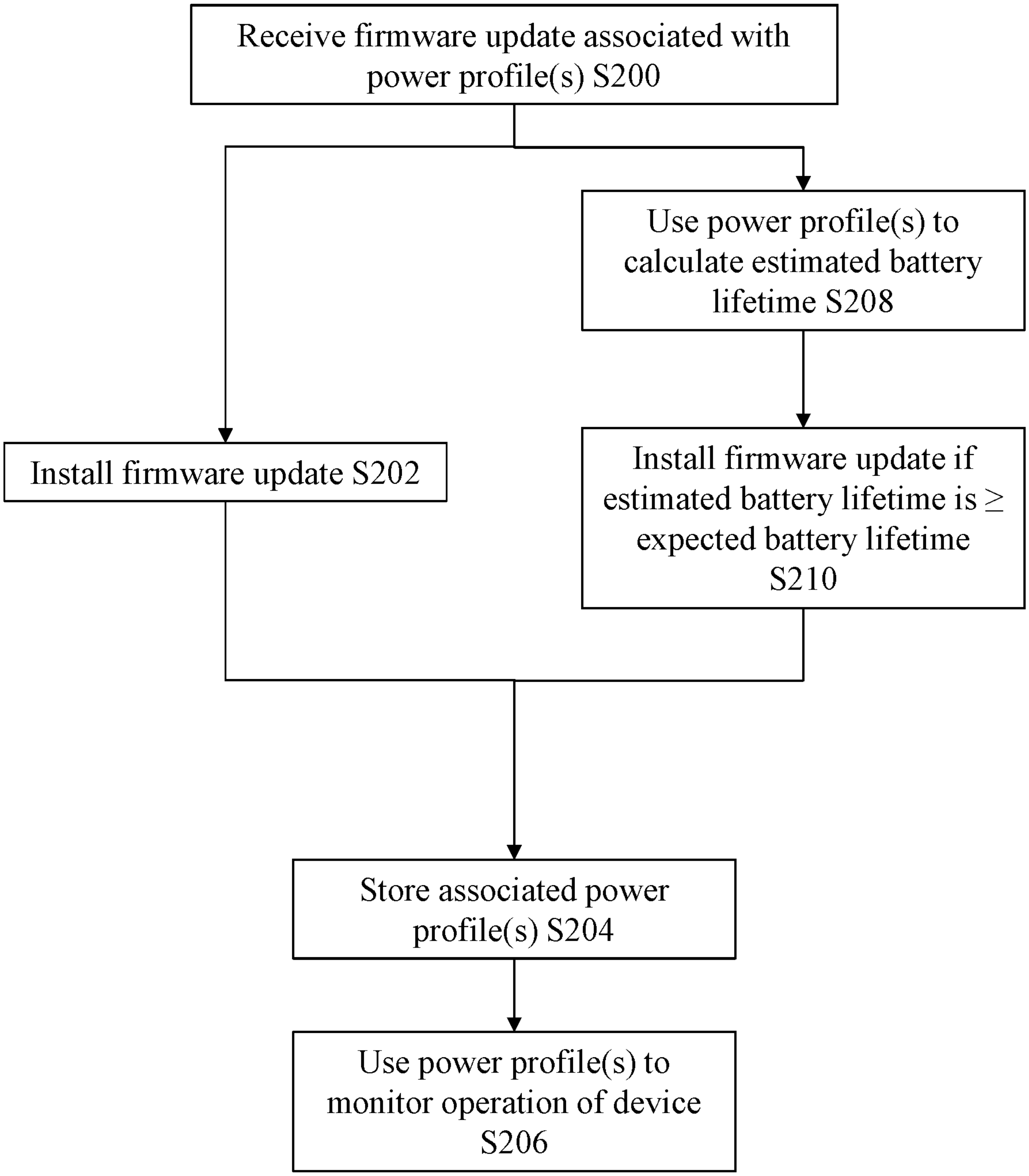
FIG. 2 shows a flowchart of example steps which may occur when a device receives a firmware update.

Turning to FIG. 2, this shows a flowchart of example steps which may occur when a device 102 receives a firmware update. More specifically, FIG. 2 shows two possible ways the device 102 may process a received firmware update. The processing begins, in either case, when device 102 receives a firmware update that is associated with at least one power profile for at least one device process (step S200). Each power profile may relate to a particular device process, but multiple power profiles may be provided for a particular device process (e.g. for different states of the device process). The firmware update may be sent to the device 102 directly at step S200. Additionally or alternatively, the device 102 may receive a firmware manifest at step S200, which contains a pointer (for example a URL) to a location from which the firmware itself may be obtained. The firmware update (or firmware manifest) may comprise the at least one power profile, or may contain a pointer to a location from which the power profile(s) may be obtained.

The or each power profile associated with a particular device process may comprise at least one power consumption band that defines a range of possible power consumption values over time for that device process. As mentioned above, the device 102 may monitor the power consumed by a device process, and compare it with the information in the power profile for that device process, to determine whether the device process is operating as expected or if the device process is consuming more or less power than defined in the power profile. If there are multiple power profiles associated with the same device process, the device must use the appropriate power profile to assess whether the device process power consumption is expected. For example, there may be an "idle" power profile for a device process when it is in an idle state, there may be an "active" power profile for when the device process is active, and there may be a "communication with X" power profile for when the device process involves communicating with an element X (e.g. another device or remote server 110).

FIG. 2 shows two example processing actions that may be undertaken when a firmware update is received at step S200.

In embodiments, the device 102 may (obtain and) install the received firmware update (step S202), and may (obtain and) store the associated power profile(s) in storage 116 (step S204). Information about which power profiles are associated with each device process, and for which operational state, may be stored in a look-up table or similar, to enable the device 102 to readily determine which power profile to use to determine if the device process power consumption is as expected. The processor 104 may use the power profiles stored in storage 116 to monitor the operation of the device 102 (step S206). This will be described in more detail below with respect to FIG. 3.

In embodiments, the device 102 may not immediately install the received firmware update or may not immediately obtain the firmware update pointed to in a received firmware manifest. Instead, the processor 104 may analyse the power profiles(s) associated with the firmware update/firmware manifest to determine whether installing the firmware update may reduce the operational lifetime of the device 102. The operational lifetime of the device 102 may be reduced if, for example, the device 102 is battery-powered—if the firmware update means the device 102 starts to consume more power, the device 102 will use more power from the battery and therefore, the overall lifetime of the device 102 may be shortened. Thus, at step S208, the processor 104 may use the power profile(s) to calculate an estimated device lifetime (or battery lifetime). If the power profile(s) associated with the firmware update indicate that more power is going to be consumed by a particular device process, such that the lifetime of the device 102 may be reduced, the device 102 may require additional permission or authorisation to install the firmware update. This analysis is described in more detail below with respect to FIG. 4. However, if the estimated device lifetime is greater than or equal to the expected battery lifetime (which may have been specified by the device manufacturer or otherwise), then the device 102 may proceed to (obtain and) install the firmware update (step S210), and to (obtain and) store the associated power profile(s) in storage 116 (step S204). The processor 104 may use the power profiles stored in storage 116 to monitor the operation of the device 102 (step S206).

Accordingly, in embodiments there is provided a method of monitoring operation of a device, the method comprising: receiving, at the device, a firmware update associated with at least one power profile for a device process, the power profile comprising: at least one power consumption band defining a range of possible power consumption values over time of the device process, each power consumption band associated with a probability that the device process power consumption falls within the power consumption band.

In embodiments, the method may comprise storing the at least one power profile following installation of the firmware update.

Figure 3:
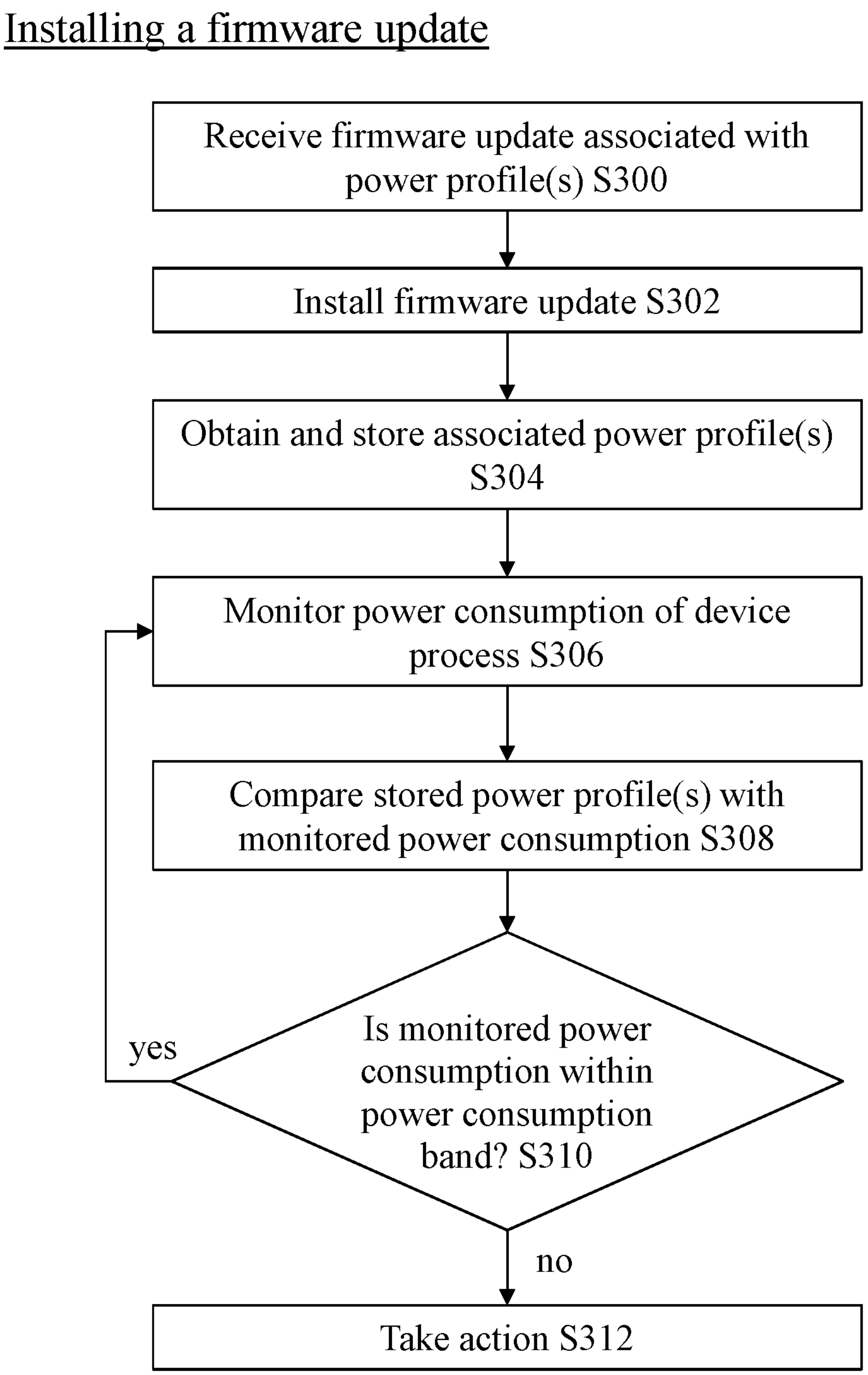
FIG. 3 shows a flowchart of example steps for monitoring operation of a device which occur after a device receives and installs a firmware update.

FIG. 3 shows a flowchart of example steps for monitoring operation of a device, which may occur after a device receives and installs a firmware update. The flowchart corresponds to the processing action shown on the left-hand branch of FIG. 2.

At step S300, the device 102 receives a firmware update associated with at least one power profile, or a firmware manifest, as explained above with respect to FIG. 2. If the device 102 receives a firmware manifest, the device 102 may use information within the manifest to determine where the update itself is located and may then proceed to download, request or otherwise obtain the update from this location. Once the device 102 has the firmware update (software), the device 102 installs the firmware update (step S302). If the firmware update comprises at least one power profile, the device 102 stores the power profile(s) in storage 116 (step S304). If the firmware update comprises pointers to where the or each power profile can be found, the device 102 may first obtain/download each power profile, and then stores the power profile(s) in storage 116. The processor 104 is now able to use the power profile(s) to monitor the operation of the device 102 by matching recorded known-good pre-aggregated power profiles for power consumption between state transitions. Each power profile associated with a particular device process may comprise at least one power consumption band or power consumption distribution mask that defines a range of possible power consumption values over time for that device process.

At step S306, the device 102 monitors the power consumption of at least one device process. The device 102 may use power meter 108, for example, to measure or estimate the power consumed by a device process at a given point in time, or over a given period of time. The device 102 may monitor the power consumption of any device process. For example, the device 102 may monitor the power consumption of a device process which is active, running, idle, in sleep-mode, etc. This is because a device process may consume more power than expected in any one or more of its operational states. For example, a device process may begin, as a result of the firmware update, consuming more power in an idle state, which may cause the lifetime of the device 102 to decrease.

It is understood that power-states can be interrupted by scheduling events—this interrupts the gathering of power distribution data in one thread and continues the power distribution measurement in the other thread. To enable that behaviour, each thread needs to remember the currently active state before switching out—and restore state back when continuing operation. Currently active states can be either remembered on the stack or in thread/process-specific data structures. It is further understood that the measurement of power distribution/bands happens in multiple independent instances across processes/threads, so power consumption can be correctly attributed to its owner.

In embodiments, the step of monitoring power consumption may comprise: monitoring, using at least one monitoring apparatus, power directly consumed by the device process.

In embodiments, the step of monitoring power consumption may comprise:

monitoring, using at least one monitoring apparatus, aggregated power consumed by the device while the device process is running; and disaggregating the aggregated power to determine the power consumed by the device process.

At step S308, the device compares the appropriate stored power profile with the monitored power consumption of the device process. For example, if the power consumed by a device process in an idle state is monitored at step S306, then the power profile for that device process in the idle state is used at step S308. Each power profile associated with a particular device process may comprise at least one power consumption band that defines a range of possible power consumption values over time for that device process. The device 102 may monitor the power consumed by the device process, and compare it with the information in the power profile for that device process, to determine whether the device process is operating as expected or if the device process is consuming more or less power than defined in the power profile.

At step S310, if the monitored power consumption of the device process is determined to be within one of the power consumption bands of the associated power profile, then the device process is considered to be performing/operating as expected. The process returns to step S306. However, if the monitored power consumption of the device process does not fall within one or more of the power consumption bands of the associated power profile, the device 102 takes the necessary action (step S312).

Figure 13:
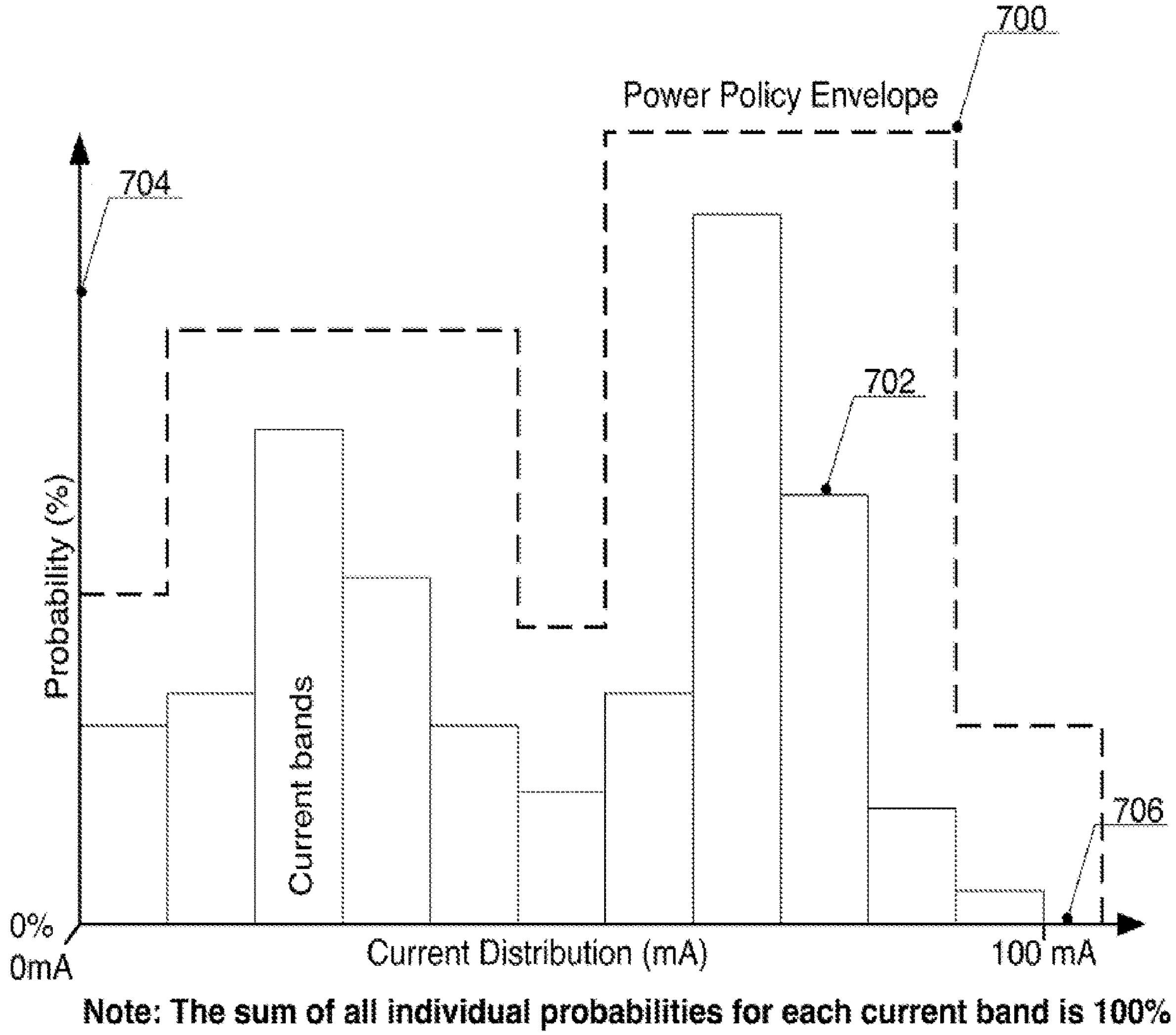
FIG. 13 is a graph showing how a power consumption profile may comprise a probability distribution having one or more bands, and/or may comprise a probability envelope having one or more peaks.

Each power profile associated with a particular device process may comprise a power consumption probability distribution having at least one power consumption band. The power consumption probability distribution defines the likelihood of a certain power being consumed (or current being drawn) during a particular time window/time period (Δt). FIG. 13 is a sketch showing how a power profile may comprise a power consumption probability distribution having one or more bands. The graph in FIG. 13 shows the probability (y axis) of a particular current being consumed/drawn by a device process (x axis). There are a number of peaks or bands indicating the most likely amounts of current to be consumed by a device process. Some peaks/spikes in power consumption/current consumption are expected, but do not occur frequently, and therefore the probability distribution shows how likely each peak/spike is. The probability distribution may be established by testing a device or by modelling a device. However, while the probability distribution provides a statistical likelihood of a specific current or power being consumed by a device process, in reality, a device process may not consume precisely the same current/power as one of the bands of the probability distribution. For example, a probability distribution may indicate that a device process has a very high chance of consuming 100 mA, but in reality, only 95 mA may be measured. In this case, it may appear that the device process is behaving in an unexpected way, but this may be because the probability distribution bands do not have tolerances or allow for statistical error.

Therefore, each power profile associated with a particular device process may comprise a power consumption probability envelope. As shown in FIG. 13, the power (or current) consumption probability envelope forms an envelope around the probability distribution, such that instead of there being multiple peaks/spikes, there are larger/wider windows of expected power/current consumption, which allow for errors in measurements and provides some tolerance. In this case, the power/current consumed by a device process is expected to remain within the envelope (i.e. below the envelope line in FIG. 13). The amount of time for which the device process falls outside the envelope (i.e. above the envelope line in FIG. 13) may be used to identify unexpected behaviour. Similarly, the extent to which the device process falls outside the envelope, that is by how much the device process falls outside the envelope, may be used to identify unexpected behaviour. A small amount of time outside of the envelope may be considered similar to a slow trigger, while a large amount of time outside of the envelope may be considered similar to a fast trigger.

For context, the distribution of bands in FIG. 13. can be for a given time window and resolution (with what probability was the current/power within a 60-70 mA window and so on). Both the windows and the probabilities can be optionally logarithmic or arbitrarily sized.

The widths of each window can optionally also be arbitrary size—let's say the following bands:

Band 0: 0-100 uA,
Band 1: 100-300 uA,
Band 2: 300-700 uA,
Band 3: 700-1.5 mA,
Band 4: 1.5 mA-3 mA,
Band 5: 1.5 mA-10 mA,
. . .
Band 10: 80-110 mA In power consumption probability envelope may be determined in two ways. For example, the envelope may be calculated over a sliding time window, over discrete overlapping time windows or over non-overlapping time windows. The time windows have length Twindow and are split into N discrete time steps Δt and M discrete power bands. Within each time step Δt, the power consumption in the time step is averaged and quantised into one of the M power bands such that N*Δt=Twindow. In this embodiment, the probability of a power consumption being in a band M during a time Δt is calculated. This results in a probability distribution (as shown in FIG. 13), and the envelope may be formed around the probability distribution (as shown by the envelope line in FIG. 13). The probability axis and the power/current axis may be linear axes or non-linear axes. As will be explained below, in some cases, it may be useful to send power consumption data to an external server for analysis. To reduce the amount of data to be transmitted to the external server, it may be useful to represent the probability distribution or probability envelope using one or more non-linear axes. For example, at least one of the axes may use a logarithmic scale if equal resolution is not required or needed across the whole scale or range of values, which may reduce the amount of data being transmitted. Thus, the probability distribution or envelope may be compressed for transmission, and/or for storing the power profile for use within the IoT device 102, and/or for storing data to be analysed.

Another way to determine the power consumption probability envelope is by performing a fast Fourier transform (FFT) over the power/current consumption window—this can be used to measure dynamic behaviour. The envelope may be used to define policies for frequency components and their individual magnitude in the power/current consumption patterns.

The two techniques may be used separately or in combination. Furthermore, it may also be useful to measure power/current consumption using windows of different sizes in parallel. For example, if N (the number of discrete time steps) is always the same (e.g. 1024), but the power consumption patterns may require multiple windows of different sizes (e.g. Twindow is one second, one minute, one hour, one day and/or one week), then Δt would be different for each window length (because Δt=Twindow/N). in this case, it may be useful to use both techniques for these different Twindow lengths in parallel and apply distinct profiles for different window sizes.

Accordingly, in embodiments the method may comprise: monitoring power consumption of the device process; comparing the monitored power consumption with the stored at least one power profile; determining whether the monitored power consumption falls within the at least one power consumption band of the received power profile; and taking an action if the monitored power consumption is determined not to fall within the at least one power consumption band.

The step (S312) of taking an action if the monitored power consumption is determined not to fall within the at least one power consumption band may comprise at least one of:

- revoking access to at least one peripheral from the list of one or more peripherals in the power profile of the device process;
- throttling access to at least one peripheral from the list of one or more peripherals in the power profile of the device process (e.g. by reducing voltage or clocking down the peripheral);
- notifying the device process to deconfigure or reconfigure at least one peripheral from the list of one or more peripherals in the power profile of the device process;
- disabling device caches;
- refusing to allocate memory to the device process;
- terminating the device process;
- rebooting the device;
- restarting the device (this may cause malware stored in RAM to be deleted/removed);
- power-cycling the device;
- switching the device into a low-power operational mode;
- switching the device into a safe mode;
- using chip select to terminate a device function (i.e. control on a pin level to turn-off or override a device function);
- using a supervisory process to revoke access to the device process by a peripheral;
- applying a whitelist access control list to control access of peripherals to the device process;
- flagging/reporting that the received firmware update may be faulty or malicious, to a user, remote server, or backend system; and
- communicating with an external server.

In embodiments, the step (S312) of taking an action may comprise turning device processes on/off to determine which device process has caused the power consumption divergence.

In embodiments, the step (S312) of taking an action if the monitored power consumption is determined not to fall within the at least one power consumption band may comprise identifying a cause of the power consumption divergence. This may comprise determining that the cause is malware that has inadvertently been installed within device 102, or the firmware update that has been recently installed in device 102. If the cause of the power consumption divergence is determined to be malware or the firmware update, the device 102 may disable all device processes except a process or set of processes for communicating with an external server (e.g. server 110). The device 102 may communicate with an external server to determine what action to take in response to identifying malware or determining that the firmware update causes the device 102 to consume more power than expected. For example, the device 102 may receive, from the external server, instructions to roll-back to a previous version of the firmware, or may receive a new firmware update to install on the device. In embodiments, the device 102 may receive instructions to not take any action with respect to the power consumption divergence. For example, if one device process consumes more power than expected, but most of or all of the other device processes consume less than the expected power or the expected power, the lifetime of device 102 may not be impacted significantly. In this case, the device 102 may be instructed to ignore that one device process consumes more power than expected.

In embodiments, the step (S312) of taking an action if the monitored power consumption is determined not to fall within the at least one power consumption band may comprise: reporting to a user of the device or a remote server that the monitored power consumption has diverged from the stored at least one power profile.

Figure 4:
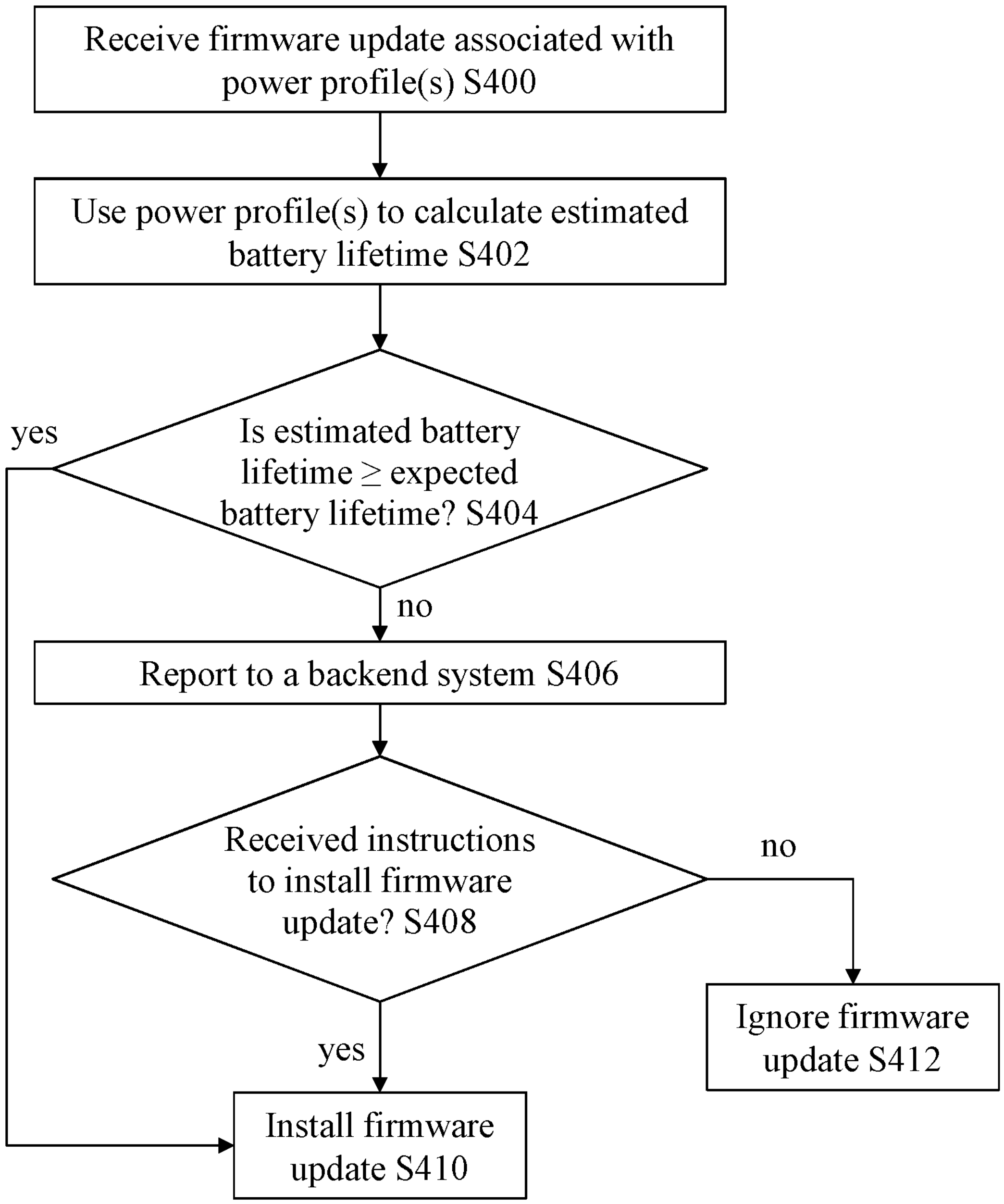
FIG. 4 shows a flowchart of example steps for monitoring operation of a device which occur when a device receives a firmware update.

In embodiments, as mentioned earlier, the device 102 may not install a firmware update immediately, but may analyse the power profiles first to determine whether the firmware update will increase or decrease the lifetime of the device 102. FIG. 4 shows a flowchart of example steps for monitoring operation of a device which occur when a device receives a firmware update. The flowchart corresponds to the processing action shown on the right-hand branch of FIG. 2.

At step S400, the device 102 receives a firmware update associated with at least one power profile, or a firmware manifest, as explained above with respect to FIG. 2. If the device 102 receives a firmware manifest, the device 102 may use information within the manifest to determine where the update or the power profiles are located and may then proceed to download, request or otherwise obtain the update/power profiles from this location. If the device 102 receives a firmware update, the device 102 may extract any power profiles from the firmware update, or may obtain the power profiles from a location indicated within the firmware update. Once the device 102 has the power profiles, the device 102 proceeds to analyse the power profiles.

At step S402, the device 102 uses the at least one power profile to calculate an estimated battery lifetime of the device. The device 102 then determines if the estimated battery lifetime is greater than or equal to an expected battery lifetime (step S404). That is, the processor 104 of device 102 may analyse the power profiles(s) associated with the firmware update/firmware manifest to determine whether installing the firmware update may reduce the operational lifetime of the device 102. The operational lifetime of the device 102 may be reduced if, for example, the device 102 is battery-powered—if the firmware update means the device 102 starts to consume more power, the device 102 will use more power from the battery and therefore, the overall lifetime of the device 102 may be shortened. If at step S404, the estimated device/battery lifetime is greater than or equal to the expected battery lifetime (which may have been specified by the device manufacturer or otherwise), then the device 102 may proceed to (obtain and) install the firmware update (step S410). The processor 104 may use the power profiles to monitor the ongoing operation of the device 102, i.e. following the process from step S306 of FIG. 3.

However, if at step S404 the power profile(s) associated with the firmware update indicate that more power is going to be consumed by a particular device process, such that the lifetime of the device 102 may be less than the expected battery lifetime, the device 102 may require additional permission or authorisation to install the firmware update.

At step S406, the device 102 may report the results of the analysis to a backend system or external server or user of the device 102, and request instructions on whether or not to install the firmware update. The backend system/external server/user may decide whether the reduction in battery lifetime is acceptable. At step S408, the device 102 checks whether it has received instructions to install the firmware update. If yes, the device 102 proceeds to (obtain and) install the firmware update (step S410). The device 102 may use the power profiles associated with the firmware update to monitor the ongoing operation of the device 102, i.e. following the process from step S306 of FIG. 3. If no, the device 102 may ignore the firmware update, i.e. may not install the received firmware update (step S412).

In embodiments, each power profile associated with the received firmware update comprises a public portion and a private portion. That is, each power profile may be cryptographically signed for security/confidentiality. The private portion of each power profile may contain settings that are confidential and may be set by a manufacturer of the device 102. For example, the private portion may include internal device settings, such as power management, clock changes, I/O configurations, peripheral configurations, system register values, etc. Thus, the private portion may be encrypted for each device 102 or for each class/type of devices. The private portion of each power profile may be considered to contain the instructions for the device 102 to perform specific actions in order to achieve the power profile. In embodiments, the private portion may be or may contain executable code (native or interpreted) for applying the settings/configurations.

Figure 6:
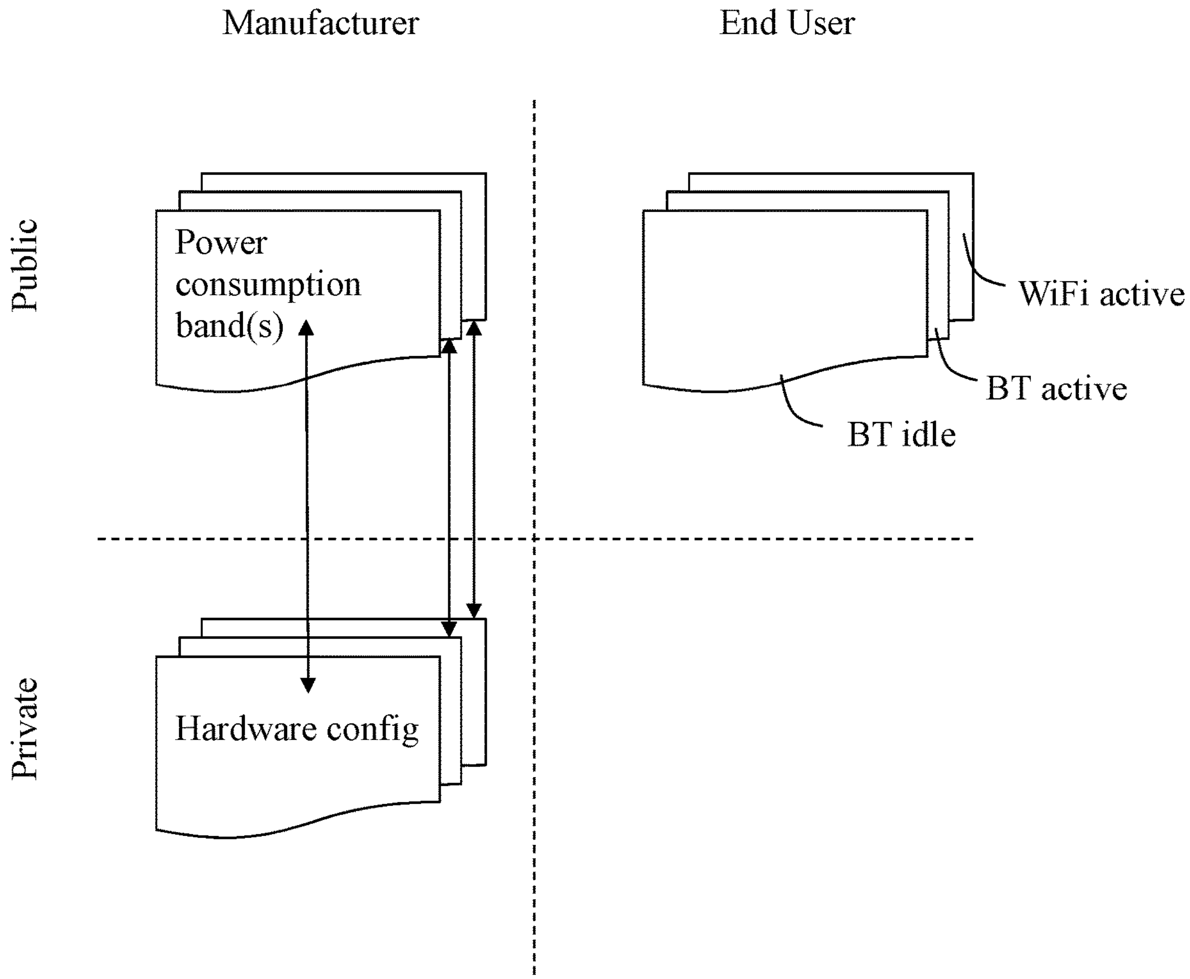
FIG. 6 is a schematic diagram showing how each power profile associated with a firmware update may have a public portion and a private portion.

FIG. 6 is a schematic diagram showing how each power profile associated with a firmware update may have a public portion and a private portion. The manufacturer of device 102 may create a power profile that comprises a public portion and a private portion. The public portion of the power profile may comprise at least one power consumption band defining a range of possible power consumption values over time of a device process, each power consumption band associated with a probability that the device process power consumption falls within the power consumption band. The private portion of the power profile ma comprise the hardware configuration settings needed to achieve the power consumption values in the public portion. Each public portion may relate to a specific device process state/operation mode (e.g. Bluetooth idle, Bluetooth active, WiFi active, etc.) As shown in FIG. 6, the end user or the secure and/or trusted state/power monitor of device 102 may only be able to view the public portion of the power profile. That is, the public power profiles may be delivered to an end user with the firmware update, and both the power profiles and the firmware update may be cryptographically signed by the author for security/authenticity. Each firmware update may be rejected by an end user if the public portions of the power profile indicate power consumption regression, i.e. that the device 102 will start consuming more power if the firmware update is installed. The end user may be able to decide whether they care about the device process state that may consume more power if the firmware update is installed. For instance, if the public portions of the power profiles indicate that the device 102 will use more power during a provisioning process, the user may decide that since provisioning has already taken place, this will not affect the battery lifetime of device 102, and may allow device 102 to install the firmware update.

Accordingly, in embodiments the method of monitoring operation of the device may comprise using the at least one power consumption band in the public part of the at least one power profile to calculate an estimated lifetime of a battery of the device. This may comprise comparing the calculated estimated battery lifetime with an expected battery lifetime; and reporting, to a user or a backend system, if the calculated estimated battery lifetime is lower than the expected battery lifetime.

The method may comprise requesting, from the user, instructions on whether to install the received firmware update if the calculated estimated battery lifetime is lower than the expected battery lifetime, or if the estimated power consumption of the device is higher than the expected power consumption. This may comprise determining, when the monitored power consumption of the device process falls within the at least one power consumption band, a state transition map defining expected state transitions which occur when the device process is running; and storing the state transition map.

In embodiments, a staged rollout of a firmware update may be used to test the update and new power profiles across a sample set of devices. This may allow determination of whether the firmware update causes the power consumption of the device 102 to increase, and which device process or processes are responsible for the power consumption divergence. Device processes could be turned on and off in the sample set of devices to test different power profiles and combinations of power profiles, and thereby determine if any device process results in increased power consumption. This may allow the firmware update to be fine-tuned before it is rolled out to all devices 102. For example, feedback on which device process and associated power profile may be problematic may be provided to the author of the firmware update.

Methods for monitoring operation of a device by observing state transitions which occur during the running of a device process following a firmware update are now described. In embodiments, the method may comprise comparing observed state transitions (which occur while a device process is running) to a state transition map generated within the device. This is described with reference to FIG. 7 and FIG. 10. In embodiments, the method may comprise comparing observed state transitions to a state transition model that is part of, or associated with, the firmware update. This is described with reference to FIG. 11 and FIG. 12.

Embodiments provide for an optional usage of a trusted domain from a hypervisor, SGX or trustzone-A/-M to perform state transition measurements independently from an untrusted running OS/software—and that OS/software may constantly notify the trusted domain of state changes that require swapping the power profile. In embodiments, the untrusted domain cannot influence the measurement and the integrity of the power profiles, and it clearly announces switches between profiles, the trusted domain can verify if the application is operating within its promised parameters.

The trusted or untrusted security domain can record the state changes (only their absolute probability needs to be recorded, rather than the full log of changes). Using these probabilities, new power profiles can be matched to these historic probabilities to determine whether a specific instance use case of the device will use more power with a firmware update.

In embodiments, a staged rollout of a firmware update may be used to test the update and new power profiles across a sample set of devices. This may allow determination of whether the firmware update causes the power consumption of the device 102 to increase, and which device process or processes are responsible for the power consumption divergence. Device processes could be turned on and off in the sample set of devices to test different power profiles and combinations of power profiles, and thereby determine if any device process results in increased power consumption. This may allow the firmware update to be fine-tuned before it is rolled out to all devices 102. For example, feedback on which device process and associated power profile may be problematic may be provided to the author of the firmware update.

Figure 7:
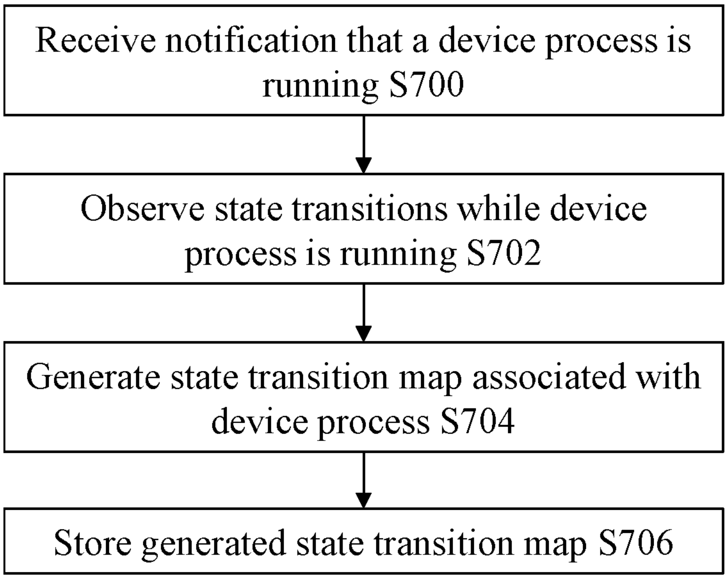
FIG. 7 is a flowchart of example steps for generating state transition maps for device processes.

FIG. 7 is a flowchart of example steps for generating state transition maps for device processes. Device 102 may be instructed to, or otherwise, begin observing the state transitions which occur when device processes are running. The device 102 may receive instructions from a remote server/backend system, for example, if the device 102 is being used to test new firmware or is part of a staged rollout of firmware. In this case, the device 102 may also receive a firmware update, and may need to (obtain and) install the firmware update before beginning the state transition observation. The device 102 may observe all state transitions which occur when a device process is running, including when the device process is in an idle mode or sleep mode.

When a device process is about to begin running, or begins running, the processor 104 may receive a notification (step S700), which may trigger the processor 104 or other element within the device 102 to begin observing the state transitions which occur when the device process is running. At step S702, the device observes the state transitions which occur during running of the device process, and then uses these to generate a state transition map associated with the device process (step S704). The state transition map may be generated after observing the device process once, or over a prolonged period of observing the device process. The device may then store the generated state transition map for the device process (step S706). This process may be repeated for each device process or multiple device processes which run in the device 102. Further, the transition probability can also be aggregated across multiple devices for the same state transition. It may be possible to observe state transitions for more than one device process simultaneously. If the device 102 was instructed to observe state transitions, the device 102 may communicate/transmit the generated state transition maps for the device processes to a requesting party (e.g. backend system or author of the firmware update). This may enable, for example, an author of a firmware update to determine if the firmware update is behaving as expected or if there may be problems or faults within the firmware. These problems or faults may be corrected before the firmware update is rolled out more widely.

Figure 8:
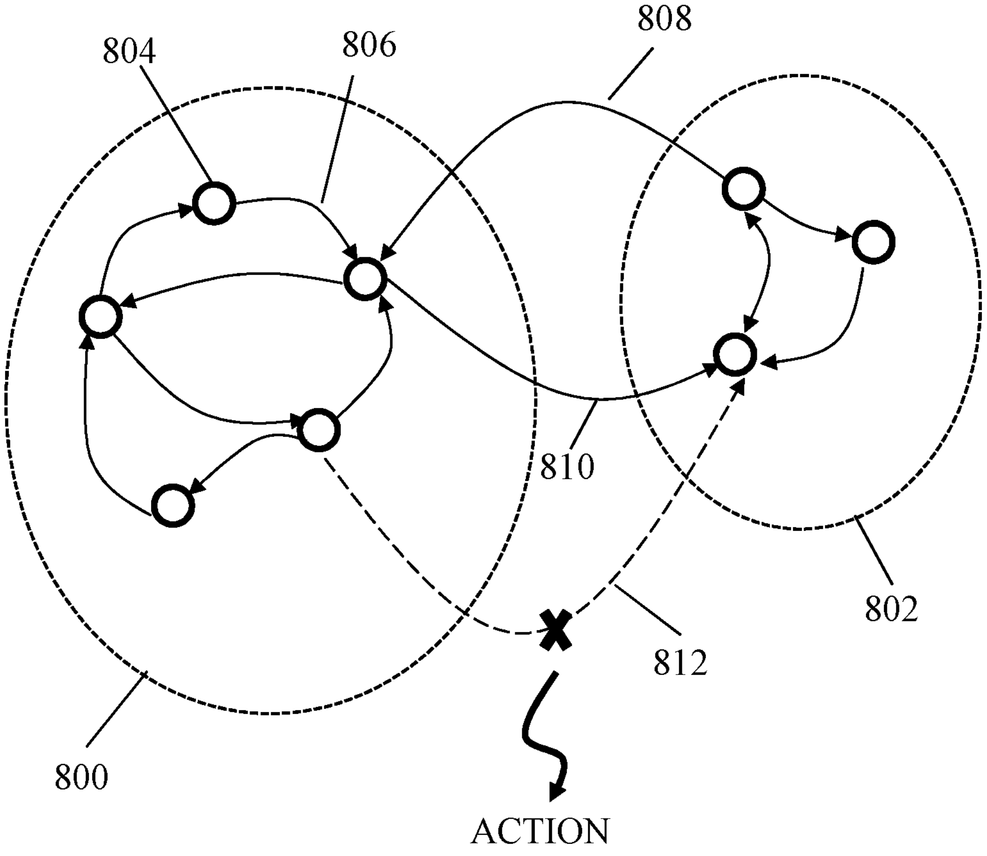
FIG. 8 is a schematic diagram illustrating state transitions maps for device processes.

FIG. 8 is a schematic diagram illustrating state transitions maps or models for device processes. A first state transition map 800 is shown for a first device process (or a device process operational mode), and a second state transition map 802 is shown for a second device process (or another device process operational mode). Within each map 800, 802, are multiple states 804 (represented by circles) and state transitions 806 (represented by arrows between circles). State transitions 808 and 810 show transitions between state transition maps, e.g. when a device process ends and another device process begins, or when a device process changes between operational states (e.g. from active to idle). State transition 812 is therefore, a rogue transition and is not one that is defined by the state transition maps 800 and 802. This state transition 812 may therefore, cause the device 102 to take action. For example, the device 102 may flag or report a fault in a firmware update, or may report that malicious malware may have been executed in the device.

Figure 9:
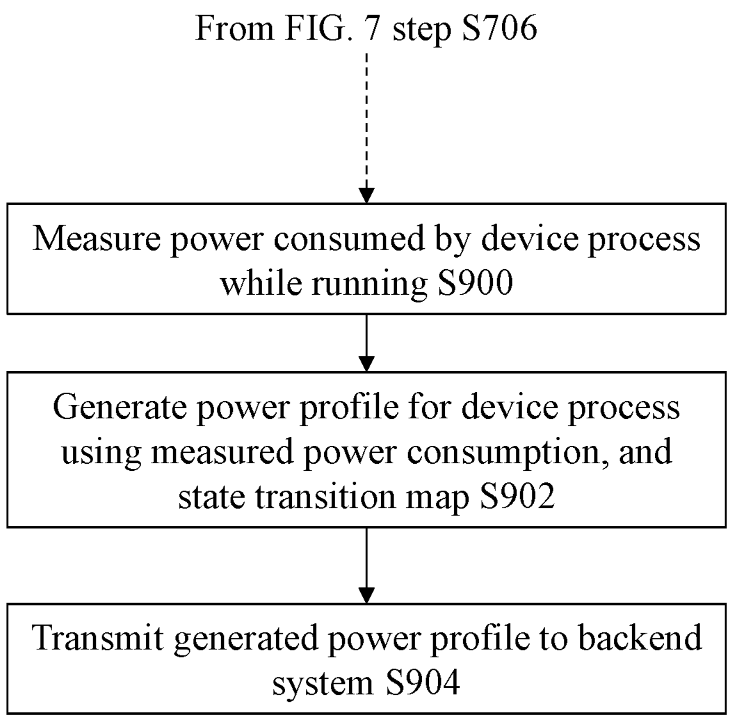
FIG. 9 is a flowchart of example steps for generating a power profile for a device process.

FIG. 9 is a flowchart of example steps for generating a power profile for a device process. In embodiments, device 102 may be instructed to, or otherwise, begin measuring the power (or energy) consumed by a device process when it is running (and in each of its operational modes). The device 102 may receive instructions from a remote server/backend system, for example, if the device 102 is being used to test new firmware or is part of a staged rollout of firmware. In this case, the device 102 may also receive a firmware update, and may need to (obtain and) install the firmware update before beginning the power consumption monitoring. The power consumption data may be used by a backend system to include power profile information in the firmware update.

Thus, in embodiments, the device 102 may measure, during running of the device process, power consumed by the device process (step S900). The power consumption measuring may take place while the state transitions associated with the device process are being observed, or at a different time. The device 102 may need to perform some disaggregation and/or statistical techniques to a measured power to determine how much power is consumed by a particular device process, as mentioned earlier.

At step S902, the device 102 may generate, using the measured power consumption, a power profile associated with the device process. The generated power profile may comprise: the generated state transition map for the device process; and at least one power consumption band defining a range of possible power consumption values over time of the device process, each power consumption band associated with a probability that the device process power consumption falls within the power consumption band. In particular embodiments, the device 102 may also generate an expected lifetime of a battery of the device using at least the measured power consumption; and may include the generated expected lifetime in the power profile associated with the device process.

At step S904, the device 102 may transmit the generated power profile for each device process to a remote server or backend system. The device may also store the generated power profiles. This process may be repeated for each device process or for multiple device processes which run in the device 102. It may be possible to monitor power consumption for more than one device process simultaneously. If the device 102 was instructed to monitor/measure power consumption, the device 102 may communicate/transmit the generated power profiles for the device processes to a requesting party (e.g. backend system or author of the firmware update). This may enable, for example, an author of a firmware update to determine if the firmware update is behaving as expected or if there may be problems or faults within the firmware. For example, this may enable an author of the firmware update to determine if the firmware update causes significantly more power to be consumed by the device 102, which may impact device lifetime. These problems or faults may be corrected before the firmware update is rolled out more widely. Furthermore, the generated power profiles may be used to create the power profiles that may be provided with, or associated with, a final version of the firmware update that is rolled-out to multiple devices.

In embodiments, the device 102 may receive a firmware update associated with at least one power profile for a device process, the received power profile comprising at least one power consumption band defining a range of possible power consumption values over time of the device process, each power consumption band associated with a probability that the device process power consumption falls within the power consumption band. The received power profile may also comprise a state transition map or model associated with the device process. The at least one power profile associated with the received firmware update may comprise a public portion and a private portion, wherein the public portion may comprise an indication of which device process the at least one power profile is associated with and the at least one power consumption band. The device 102 may use the at least one power consumption band in the public portion of the at least one power profile to calculate an estimated lifetime of a battery of the device.

In embodiments, the device 102 may compare the calculated estimated battery lifetime with an expected battery lifetime; and may report, to a user or a backend system, if the calculated estimated battery lifetime is lower than the expected battery lifetime. The device 102 may request, from the user or backend system, instructions on whether to install the received firmware update if the calculated estimated battery lifetime is lower than the expected battery lifetime.

Figure 10:
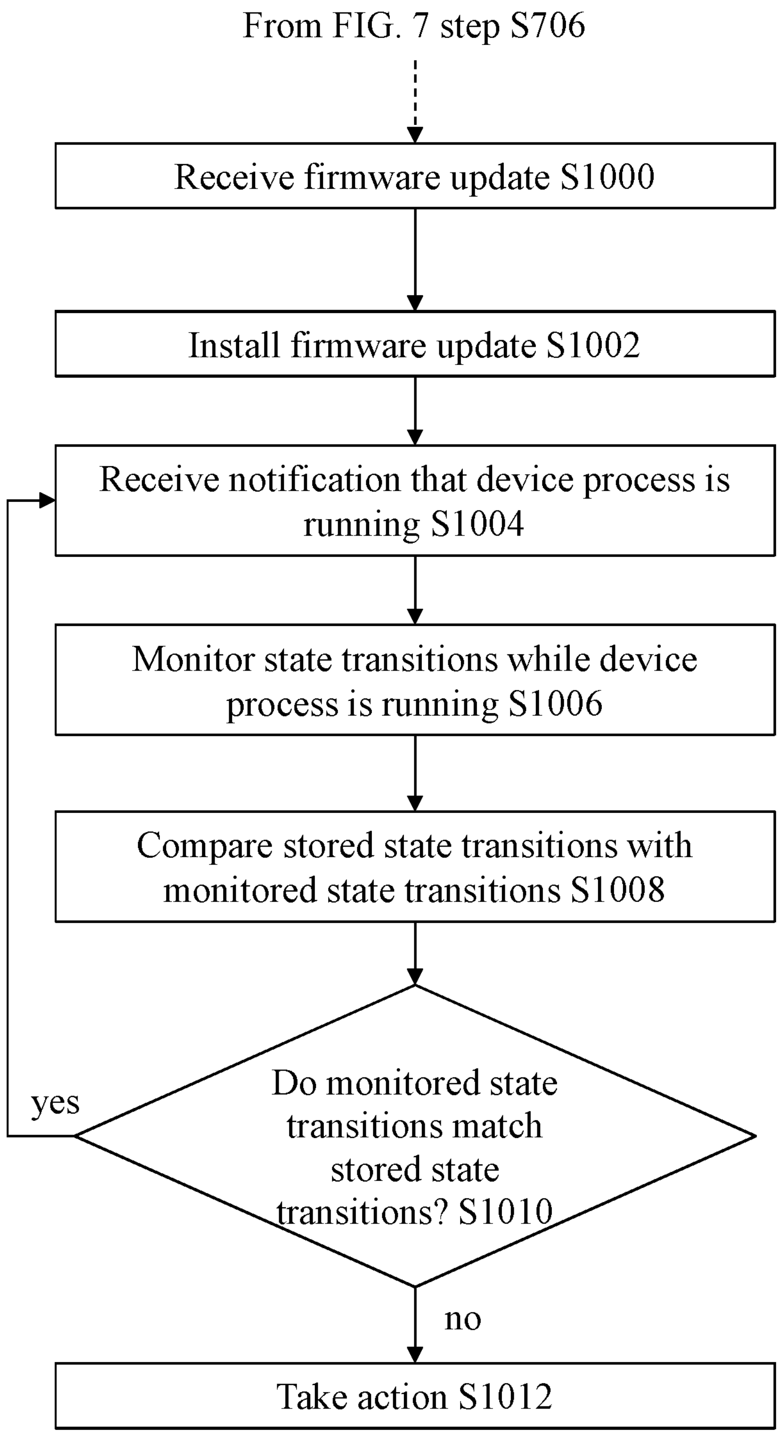
FIG. 10 is a flowchart of example steps for monitoring operation of a device using stored state transitions, after a device receives and installs a firmware update.

FIG. 10 is a flowchart of example steps for monitoring operation of a device using stored state transitions, after a device receives and installs a firmware update. In embodiments, following generation of state transition maps, a device may receive a firmware update or firmware manifest (step S1000) and may install the firmware update (step S1002). The device may have, itself, previously generated state transition maps associated with at least one device process. Following the installation of the firmware update, the device may receive a notification (or otherwise) that a device process is running/about to start running (step S1004). The device may monitor the state transitions which occur while the device process is running (step S1006), and may compare the monitored state transitions with the device's own generated state transition map associated with that device process (step S1008). The device may use this comparison to determine if the device process is behaving as expected (i.e. as per the generated state transition map) following the firmware update. If at step S1010 it is determined that the monitored state transitions match the stored state transitions for the device process, the device 102 may assume that the device process is behaving as expected after the firmware update. The process may then return to step S1004. If at step S1010 it is determined that the device process exhibits at least one different state transition to those state transitions the device expects to occur, the device may flag this as indicative of potentially faulty or malicious firmware (step S1012).

Accordingly, in embodiments of the present techniques, the method comprises: receiving, following installation of the firmware update, a further notification that the device process is to begin running; monitoring state transitions which occur during running of the device process; comparing the monitored state transitions with the stored state transition map associated with the device process; determining whether the monitored state transitions match the expected state transitions in the stored state transition map; and taking an action if at least one of the monitored state transitions is determined not to match the expected state transitions.

The step of taking an action if at least one of the monitored state transitions is determined not to match the expected state transitions may comprise at least one of:

- terminating the device process;
- rebooting the device;
- restarting the device;
- power-cycling the device;
- switching the device into a safe mode;
- using chip select to terminate a device process;
- communicating with a remote server or backend system;
- revoking access to at least one peripheral which is operational when the device process is running;
- throttling access to at least one peripheral which is operational when the device process is running;
- notifying the device process to deconfigure or reconfigure at least one peripheral which is operational when the device process is running;
- disabling device caches;
- refusing to allocate memory to the device process;
- switching the device into a low-power operational mode;
- using a supervisory process to revoke access to the device process by a peripheral; and
- applying a whitelist access control list to control access of peripherals to the device process.

In embodiments, the step of taking an action if at least one of the monitored state transitions is determined not to match the expected state transitions may comprise: reporting to a user or to a remote server that at least one monitored state transition has diverged from the expected state transitions.

In embodiments, the device 102 may receive instructions to update the expected state transitions for the device process. This may occur if the divergent state transition is acceptable or not harmful, or does not cause the device 102 to consume more power, for example. The device 102 may update the expected state transitions of the state transition map associated with the device process based on the monitored state transitions during normal device operation. By comparing many devices across different sites, malicious behaviour can be ruled/filtered out. Alternatively, the device 102 may receive instructions to roll-back to a previous version of the firmware, or may receive a new firmware update to install on the device. This may occur if the divergent state transition is not acceptable (e.g. causes the device 102 to consume more power), or is indicative of faulty firmware.

Figure 11:
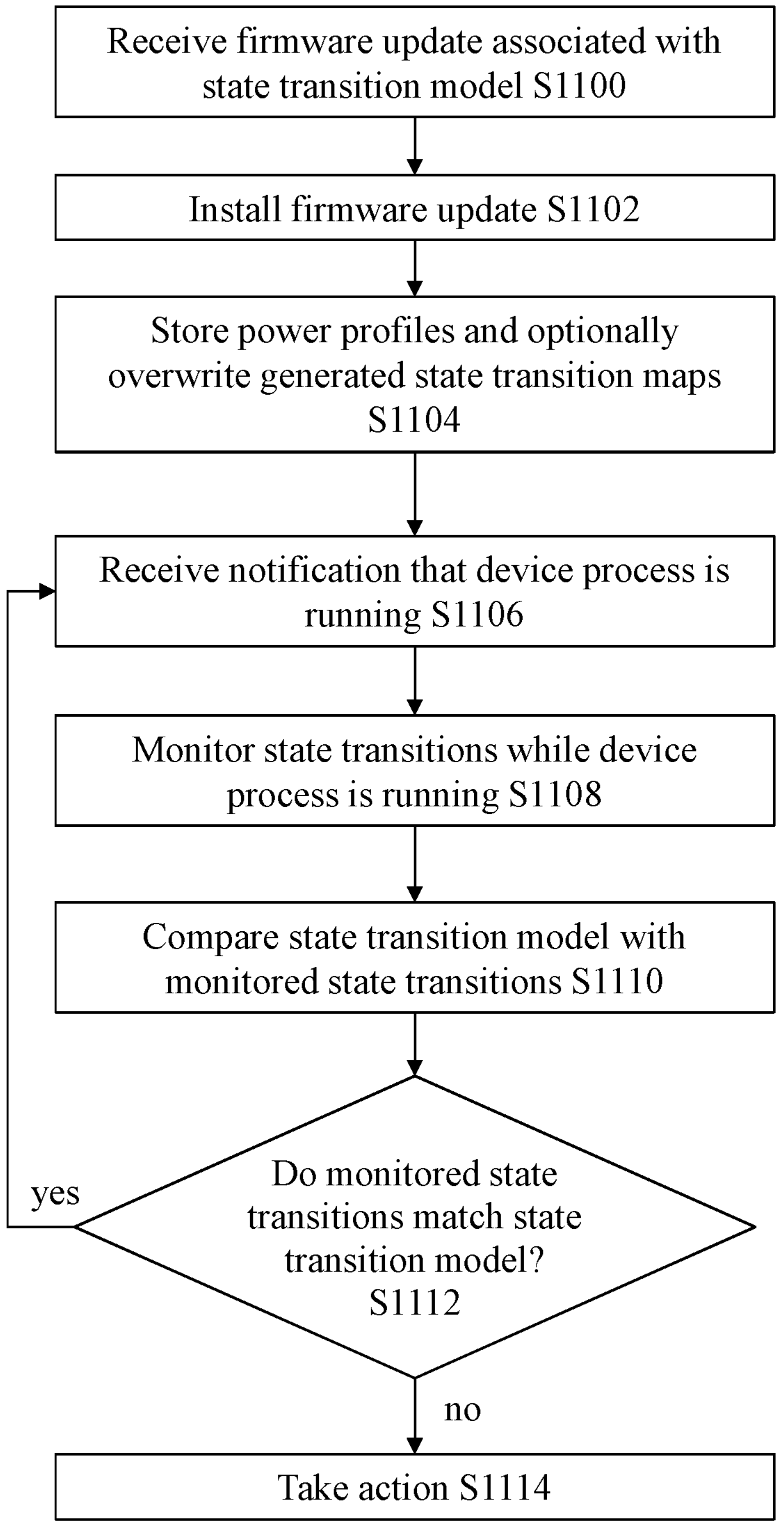
FIG. 11 is a flowchart of example steps for monitoring operation of a device after a device receives and installs a firmware update comprising at least one state transition model.

FIG. 11 is a flowchart of example steps for monitoring operation of a device after a device receives and installs a firmware update comprising at least one state transition model. (The device 102 may not have previously generated its own state transition maps. That is, this process applies to all devices 102, whether or not they were used in the staged rollout/testing of a firmware update).

In embodiments, device 102 receives a firmware update associated with at least one power profile for a device process, each power profile comprising a state transition model for the device process (step S1100). Following the installation of the firmware update (step S1102), the device may store the power profiles associated with the firmware update, including the state transition models for each device process (step S1104). If the device was previously involved in the staged rollout of the firmware update and generated its own state transition maps, the device 102 may overwrite the generated state transition maps with the state transition models of the power profiles.

The device may receive a notification (or otherwise) that a device process is running/about to start running (step S1106). The device 102 may monitor the state transitions which occur while the device process is running (step S1108), and may compare the monitored state transitions with the state transition model associated with the device process (steps S1110). The device may use this comparison to determine if the device process is behaving as per the relevant state transition model provided in the firmware update. For example, if at step S1112 the monitored state transitions of a device process match the relevant state transition model, the process may return to step S1106 (i.e. the device 102 awaits a new notification). If at step S1112 it is determined that at least one of the state transitions which occurred while the device process was running does not correspond to the state transition model, the device may flag this as indicative of potentially faulty or malicious firmware, or of an incorrect state transition model (step S1114).

Accordingly, in embodiments, the method may comprise: receiving, from the remote server or backend system, a firmware update, the firmware update associated with at least one power profile for the device process compiled using at least the generated power profile transmitted to the remote server or backend system, the at least one power profile comprising a state transition model for the device process; installing the firmware update; storing the at least one power profile following installation of the firmware update, and overwriting any generated state transition maps.

The method may further comprise: receiving, following installation of the firmware update, a further notification that the device process is to begin running; monitoring, during running of the device process, state transitions which occur during running of the device process; comparing the monitored state transitions with the state transition model of the stored power profile associated with the device process; determining whether the monitored state transitions match the expected state transitions in the state transition model of the stored power profile associated with the device process; and taking an action if at least one of the monitored state transitions is determined not to match the expected state transitions.

The step of taking an action if at least one of the monitored state transitions is determined not to match the expected state transitions may comprise reporting to a user or to a remote server that at least one monitored state transition has diverged from the expected state transitions, or may comprise any one or more of the above-listed actions.

Figure 12:
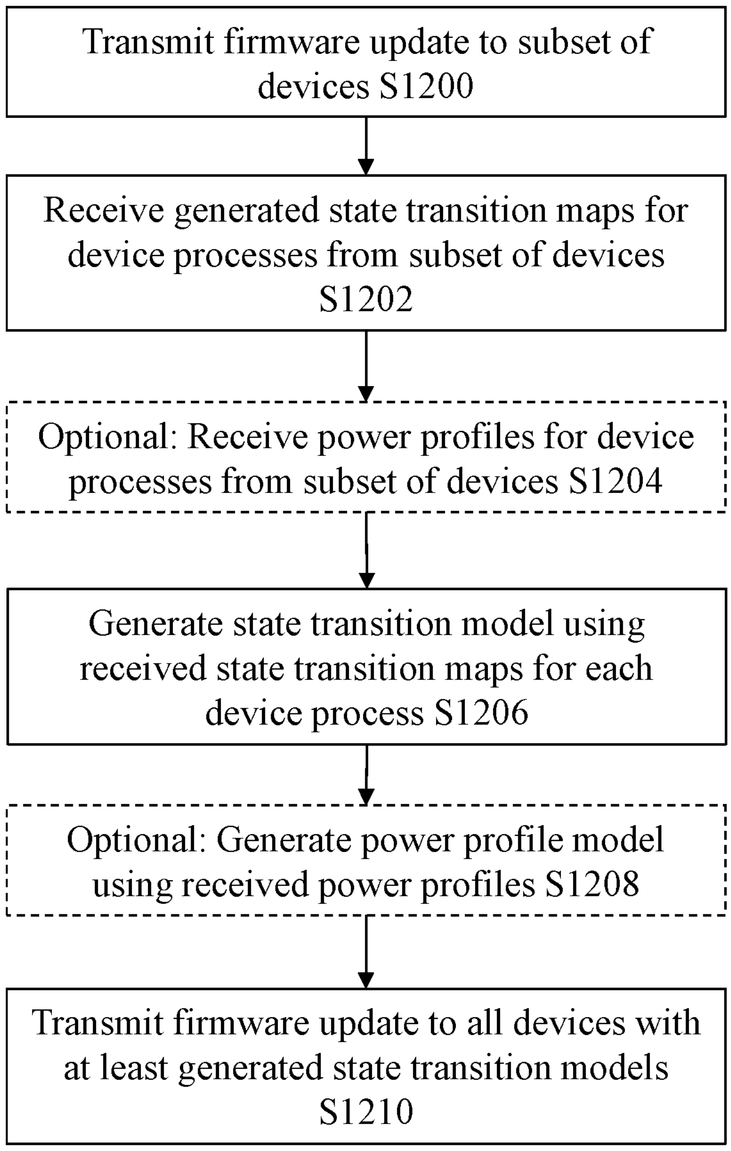
FIG. 12 is a flowchart of example steps for staged roll-out of a firmware update.

FIG. 12 is a flowchart of example steps for staged roll-out of a firmware update. In embodiments, an apparatus (e.g. a remote server or backend system) that is in a communicative relationship with a plurality of devices 102, transmits a firmware update to a subset of the plurality of devices for small-scale testing prior to rolling out the update to all devices.

The apparatus may comprise: at least one communication module to: transmit a firmware update to a subset of devices of the plurality of devices, and receive, from the subset of devices, a generated state transition map associated with at least one device process. Thus, at step S1200, the apparatus may transmit a firmware update to a subset of the plurality of devices 102. At step S1202, the apparatus may receive generated state transition maps for at least one device process from some or all of the devices in the subset of devices 102. At step S1204, in embodiments, the apparatus may also receive power profiles generated by the subset of devices 102 (where the power profile generation is described above).

The apparatus may comprise at least one processor to: generate a state transition model for each device process using the received state transition maps (step S1206). The state transition model may be a statistical model created by combining the received state transitions, and may therefore include probabilities associated with particular state transitions. The state transition models may be included in, or otherwise associated with, a revised firmware update. The at least one processor may instruct the at least one communication module of the apparatus to transmit the generated state transition model to all of the plurality of devices with the revised firmware update (step S1210). At step S1208, in embodiments, the apparatus may generate a power profile model using the received power profiles. The power profile model may be a statistical model created by combining the received power profiles, and may therefore include probabilities associated with particular power consumption bands. The power profile models may be included in, or otherwise associated with, the revised firmware update. The apparatus may transmit the power profile models to all of the plurality of devices (step S1210).

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Embodiments of the disclosure may be described as in the following clauses:

1. A machine-implemented method of monitoring operation of a device, the method comprising: receiving a notification that a device process is to begin running; observing state transitions which occur during running of the device process; generating, using the observed state transitions, a state transition map associated with the device process, the state transition map defining expected state transitions during running of the device process; and storing the generated state transition map for the device process.

2. The machine-implemented method as described in clause 1 further comprising: measuring, during running of the device process, power consumption of the device process between state transitions.

3. The machine-implemented method as described in clause 2 further comprising: generating, using the measured power consumption, a power profile associated with the device process, the generated power profile comprising: the generated state transition map for the device process; and at least one power consumption band defining a range of possible power consumption values over time of the device process, each power consumption band associated with a probability that the device process power consumption falls within the power consumption band.

4. The machine-implemented method as described in clause 3 further comprising: generating an expected lifetime of a battery of the device using at least the measured power consumption; and including the generated expected lifetime in the power profile associated with the device process.

5. The machine-implemented method as described in clause 3 further comprising: transmitting the generated power profile for each device process to a remote server or backend system.

6. The machine-implemented method as described in clause 1 further comprising: receiving, at the device, a firmware update associated with at least one power profile for a device process, the received power profile comprising at least one power consumption band defining a range of possible power consumption values over time of the device process, each power consumption band associated with a probability that the device process power consumption falls within the power consumption band.

7. The machine-implemented method as described in clause 6 wherein the at least one power profile associated with the received firmware update comprises a public portion and a private portion, wherein the public portion comprises an indication of which device process the at least one power profile is associated with and the at least one power consumption band or power profile between two state transitions.

8. The machine-implemented method as described in clause 7 further comprising: using the at least one power consumption band in the public portion of the at least one power profile to calculate an estimated lifetime of a battery of the device.

9. The machine-implemented method as described in clause 8 further comprising: comparing the calculated estimated battery lifetime with an expected battery lifetime; and reporting, to a user or a backend system, if the calculated estimated battery lifetime is lower than the expected battery lifetime.

10. The machine-implemented method as described in clause 9 further comprising: requesting, from the user or backend system, instructions on whether to install the received firmware update if the calculated estimated battery lifetime is lower than the expected battery lifetime.

11. The machine-implemented method as described in clause 1 further comprising: receiving, at the device, a firmware update; and installing the firmware update.

12. The machine-implemented method as described in clause 11 further comprising: receiving, following installation of the firmware update, a further notification that the device process is to begin running; monitoring state transitions which occur during running of the device process; comparing the monitored state transitions with the stored state transition map associated with the device process; determining whether the monitored state transitions match the expected state transitions in the stored state transition map; and taking an action if at least one of the monitored state transitions is determined not to match the expected state transitions.

13. The machine-implemented method as described in clause 12 wherein the step of taking an action if at least one of the monitored state transitions is determined not to match the expected state transitions comprises at least one of: terminating the device process; rebooting the device; restarting the device; power-cycling the device; switching the device into a safe mode; using chip select to terminate a device process; communicating with a remote server or backend system; revoking access to at least one peripheral which is operational when the device process is running; throttling access to at least one peripheral which is operational when the device process is running; notifying the device process to deconfigure or reconfigure at least one peripheral which is operational when the device process is running; disabling device caches; refusing to allocate memory to the device process; switching the device into a low-power operational mode; using a supervisory process to revoke access to the device process by a peripheral; and applying a whitelist access control list to control access of peripherals to the device process.

14. The machine-implemented method as described in clause 12 wherein the step of taking an action if at least one of the monitored state transitions is determined not to match the expected state transitions comprises: reporting to a user or to a remote server that at least one monitored state transition has diverged from the expected state transitions.

15. The machine-implemented method as described in clause 14 further comprising: receiving instructions to update the expected state transitions for the device process.

16. The machine-implemented method as described in clause 15 further comprising: updating the expected state transitions of the state transition map associated with the device process based on the monitored state transitions.

17. The machine-implemented method as described in clause 14 further comprising: receiving instructions to rollback to a previous version of the firmware, or receiving a new firmware update to install on the device.

18. The machine-implemented method as described in clause 5 further comprising: receiving, from the remote server or backend system, a firmware update, the firmware update associated with at least one power profile for the device process compiled using at least the generated power profile transmitted to the remote server or backend system, the at least one power profile comprising a state transition model for the device process; installing the firmware update; storing the at least one power profile following installation of the firmware update, and overwriting any generated state transition maps.

19. The machine-implemented method as described in clause 18 further comprising: receiving, following installation of the firmware update, a further notification that the device process is to begin running; monitoring, during running of the device process, state transitions which occur during running of the device process; comparing the monitored state transitions with the state transition model of the stored power profile associated with the device process; determining whether the monitored state transitions match the expected state transitions in the state transition model of the stored power profile associated with the device process; and taking an action if at least one of the monitored state transitions is determined not to match the expected state transitions.

20. The machine-implemented method as described in clause 19 wherein the step of taking an action if at least one of the monitored state transitions is determined not to match the expected state transitions comprises: reporting to a user or to a remote server that at least one monitored state transition has diverged from the expected state transitions.

21. The machine implemented method as described in clause 1, wherein the likelihood of each transition can be further annotated by the likelihood of the transition depending on one or more previous states.

22. The machine implemented method as described in clause 1, wherein consistent identifications for program states are used across different Firmware versions associated with the device process thereby enabling execution flow of programs and Firmware to be compared across Firmware updates.

23. The machine implemented method as described in clause 22, including matching to likely or common other system calls between notifications.

24. The machine implemented method as described in clause 1, wherein in the instance of an event interrupting an observing of a state transition or generating of a state transition map then storing the associated current observed state transition or generated state transition map and after the instance restoring the current observed state or map.

25. The machine implemented method as described in clause 1, including comparing observed state transitions across different runs or devices which occur during running of the device process with the generated state transition map.

26. The machine implemented method as described in clause 1, wherein generating, using the observed state transitions, includes a likelihood of the transition.

27. A device configured to perform the method of: receiving a notification that a device process is to begin running; observing state transitions which occur during running of the device process; generating, using the observed state transitions, a state transition map associated with the device process, the state transition map defining expected state transitions during running of the device process; and storing the generated state transition map for the device process.

28. An apparatus in communicative relationship with a plurality of devices, the apparatus comprising: at least one communication module to: transmit a firmware update to a subset of devices of the plurality of devices, and receive, from the subset of devices, a generated state transition map associated with at least one device process, and at least one processor to: generate a state transition model for each device process using the received state transition maps, and instruct the at least one communication module to transmit the generated state transition model to all of the plurality of devices with the firmware update.

29. The apparatus as described in clause 28 wherein: the at least one communication module: receives, from the subset of devices, a power profile associated with at least one device process, and the at least one processor: generates a power profile model for each device process using the received power profiles, and instructs the at least one communication module to transmit the generated power profile model to all of the plurality of devices with the firmware update.

30. A machine implemented method of carrying out a communicative relationship with a plurality of devices, the method comprising: transmitting, by a communication module, a firmware update to a subset of devices of the plurality of devices, and receiving, from the subset of devices, a generated state transition map associated with at least one device process, and on a processor generating a state transition model for each device process using the received state transition maps, and instructing the at least one communication module to transmit the generated state transition model to all of the plurality of devices with the firmware update.

31. The machine implemented method of clause 30: the at least one communication module: receiving, from the subset of devices, a power profile associated with at least one device process, and the least one processor: generating a power profile model for each device process using the received power profiles, and instructing the at least one communication module to transmit the generated power profile model to all of the plurality of devices with the firmware update.

32. A computer program product comprising a computer-readable storage medium storing computer program code operable, when loaded onto a computer and executed thereon, to cause said computer to control a method of monitoring operation of a device, the method comprising: receiving a notification that a device process is to begin running; observing state transitions which occur during running of the device process; generating, using the observed state transitions, a state transition map associated with the device process, the state transition map defining expected state transitions during running of the device process; and storing the generated state transition map for the device process.

33. A system comprising: at least one server; and a plurality of devices, each device comprising: at least one processor to monitor state transitions which occur during running of each device process, and at least one communication module to communicate with the at least one server; wherein the at least one server comprises: at least one communication module to transmit a firmware update to a subset of devices of the plurality of devices, and receive, from the subset of devices, a generated state transition map associated with at least one device process; and at least one processor to: generate an aggregated state transition model for each device process using the received state transition maps, and instruct the at least one communication module of the server to transmit the generated state transition model to all of the plurality of devices with the firmware update.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A machine-implemented method of monitoring operation of a device, the method comprising:

receiving a notification that a device process is to begin running;

observing state transitions which occur during running of the device process;

generating, using the observed state transitions, a state transition map associated with the device process, the state transition map defining expected state transitions during running of the device process; and storing, in a local memory, the generated state transition map for the device process.

2. The machine-implemented method as claimed in claim 1 further comprising:

measuring, during running of the device process, power consumption of the device process between state transitions.

3. The machine-implemented method as claimed in claim 1 further comprising:

receiving, at the device, a firmware update associated with at least one power profile for a device process, the received power profile comprising at least one power consumption band defining a range of possible power consumption values over time of the device process, each power consumption band associated with a probability that the device process power consumption falls within the power consumption band.

4. The machine-implemented method as claimed in claim 1 further comprising:

receiving, at the device, a firmware update; and installing the firmware update.

5. The machine-implemented method as claimed in claim 2 further comprising:

generating, using the measured power consumption, a power profile associated with the device process, the generated power profile comprising:

the generated state transition map for the device process; and at least one power consumption band defining a range of possible power consumption values over time of the device process, each power consumption band associated with a probability that the device process power consumption falls within the power consumption band.

6. The machine-implemented method as claimed in claim 3 wherein the at least one power profile associated with the received firmware update comprises a public portion and a private portion, wherein the public portion comprises an indication of which device process the at least one power profile is associated with and the at least one power consumption band or power profile between two state transitions.

7. The machine-implemented method as claimed in claim 4 further comprising:

receiving, following installation of the firmware update, a further notification that the device process is to begin running;

monitoring state transitions which occur during running of the device process;

comparing the monitored state transitions with the stored state transition map associated with the device process;

determining whether the monitored state transitions match the expected state transitions in the stored state transition map; and taking an action if at least one of the monitored state transitions is determined not to match the expected state transitions.

8. The machine-implemented method as claimed in claim 5 further comprising:

generating an expected lifetime of a battery of the device using at least the measured power consumption; and including the generated expected lifetime in the power profile associated with the device process.

9. The machine-implemented method as claimed in claim 5 further comprising:

transmitting the generated power profile for each device process to a remote server or backend system.

10. The machine-implemented method as claimed in claim 6 further comprising:

using the at least one power consumption band in the public portion of the at least one power profile to calculate an estimated lifetime of a battery of the device.

11. The machine-implemented method as claimed in claim 7 wherein the step of taking an action if at least one of the monitored state transitions is determined not to match the expected state transitions comprises at least one of:

terminating the device process;

rebooting the device;

restarting the device;

power-cycling the device;

switching the device into a safe mode;

using chip select to terminate a device process;

communicating with a remote server or backend system;

revoking access to at least one peripheral which is operational when the device process is running;

throttling access to at least one peripheral which is operational when the device process is running;

notifying the device process to deconfigure or reconfigure at least one peripheral which is operational when the device process is running;

disabling device caches;

refusing to allocate memory to the device process;

switching the device into a low-power operational mode;

using a supervisory process to revoke access to the device process by a peripheral; and applying a whitelist access control list to control access of peripherals to the device process.

12. The machine-implemented method as claimed in claim 7 wherein the step of taking an action if at least one of the monitored state transitions is determined not to match the expected state transitions comprises:

reporting to a user or to a remote server that at least one monitored state transition has diverged from the expected state transitions.

13. The machine-implemented method as claimed in claim 10 further comprising:

comparing the calculated estimated battery lifetime with an expected battery lifetime; and reporting, to a user or a backend system, if the calculated estimated battery lifetime is lower than the expected battery lifetime.

14. The machine-implemented method as claimed in claim 12 further comprising:

receiving instructions to update the expected state transitions for the device process.

15. The machine-implemented method as claimed in claim 13 further comprising:

requesting, from the user or backend system, instructions on whether to install the received firmware update if the calculated estimated battery lifetime is lower than the expected battery lifetime.

16. The machine-implemented method as claimed in claim 14 further comprising:

updating the expected state transitions of the state transition map associated with the device process based on the monitored state transitions.

17. The machine-implemented method as claimed in claim 9 further comprising:

receiving, from the remote server or backend system, a firmware update, the firmware update associated with at least one power profile for the device process compiled using at least the generated power profile transmitted to the remote server or backend system, the at least one power profile comprising a state transition model for the device process;

installing the firmware update; and storing the at least one power profile following installation of the firmware update, and overwriting any generated state transition maps.

18. The machine-implemented method as claimed in claim 17 further comprising:

receiving, following installation of the firmware update, a further notification that the device process is to begin running;

monitoring, during running of the device process, state transitions which occur during running of the device process;

comparing the monitored state transitions with the state transition model of the stored power profile associated with the device process;

determining whether the monitored state transitions match the expected state transitions in the state transition model of the stored power profile associated with the device process; and taking an action if at least one of the monitored state transitions is determined not to match the expected state transitions.

19. A device, comprising:

a memory; and a processor, coupled to the memory, configured to:

receive a notification that a device process is to begin running;

observe state transitions which occur during running of the device process;

generate, using the observed state transitions, a state transition map associated with the device process, the state transition map defining expected state transitions during running of the device process; and store, in the memory, the generated state transition map for the device process.

20. A computer program product comprising a computer-readable storage medium storing computer program code operable, when loaded onto a computer and executed thereon, to cause said computer to control a method of monitoring operation of a device, the method comprising:

receiving a notification that a device process is to begin running;

observing state transitions which occur during running of the device process;

generating, using the observed state transitions, a state transition map associated with the device process, the state transition map defining expected state transitions during running of the device process; and storing, in a local memory, the generated state transition map for the device process.

* * * * *